US008405691B2

(12) United States Patent
Van Ostrand et al.

(10) Patent No.: US 8,405,691 B2
(45) Date of Patent: Mar. 26, 2013

(54) FIELD SEQUENTIAL COLOR ENCODING FOR DISPLAYS

(75) Inventors: Daniel K. Van Ostrand, The Woodlands, TX (US); Carey King, Austin, TX (US); Berry Tod Cox, Spring, TX (US)

(73) Assignee: Rambus Inc., Sunnyvale, CA (US)

( * ) Notice: Subject to any disclaimer, the term of this patent is extended or adjusted under 35 U.S.C. 154(b) by 789 days.

(21) Appl. No.: 12/564,894

(22) Filed: Sep. 22, 2009

(65) Prior Publication Data

US 2010/0073568 A1 Mar. 25, 2010

Related U.S. Application Data

(60) Provisional application No. 61/098,931, filed on Sep. 22, 2008.

(51) Int. Cl.
*G09G 5/10* (2006.01)
(52) U.S. Cl. ............ 345/691; 345/690; 345/88; 345/89; 345/597; 345/598; 345/599; 345/600; 348/456; 348/578; 348/671
(58) Field of Classification Search .............. 345/88–89, 345/597–600, 690–691; 348/578, 456, 671
See application file for complete search history.

(56) References Cited

U.S. PATENT DOCUMENTS

| | | | | |
|---|---|---|---|---|
| 6,002,412 | A * | 12/1999 | Schinnerer | 345/558 |
| 6,333,725 | B1 * | 12/2001 | Kim | 345/61 |
| 7,738,002 | B2 * | 6/2010 | Ashdown et al. | 345/691 |
| 2002/0012008 | A1 * | 1/2002 | Takagi | 345/691 |
| 2004/0164980 | A1 * | 8/2004 | Hewlett | 345/418 |
| 2005/0062765 | A1 * | 3/2005 | Hudson | 345/692 |
| 2006/0146389 | A1 * | 7/2006 | Selbrede | 359/276 |
| 2006/0250423 | A1 * | 11/2006 | Kettle et al. | 345/692 |
| 2007/0035707 | A1 * | 2/2007 | Margulis | 353/122 |
| 2008/0137950 | A1 * | 6/2008 | Park et al. | 382/168 |
| 2008/0187219 | A1 * | 8/2008 | Chen et al. | 382/173 |
| 2008/0192065 | A1 * | 8/2008 | Selbrede et al. | 345/589 |
| 2010/0033516 | A1 * | 2/2010 | Deppe | 345/690 |
| 2010/0067863 | A1 * | 3/2010 | Wang et al. | 386/4 |

FOREIGN PATENT DOCUMENTS

| | | |
|---|---|---|
| JP | 2000137461 | 5/2000 |
| JP | 2001100709 | 4/2001 |
| JP | 2002268034 | 9/2002 |
| WO | WO2007016511 | 2/2007 |

* cited by examiner

*Primary Examiner* — Xiao M. Wu
*Assistant Examiner* — Todd Buttram
(74) *Attorney, Agent, or Firm* — Renner, Otto, Boisselle & Sklar, LLP

(57) ABSTRACT

The optical performance is enhanced of display systems that use field sequential color and pulse width modulation to generate color and color gray scale values. Such enhancement may be achieved by various data encoding methods disclosed herein that may include temporal redistribution of bit values to mitigate color motional artifacts associated with field sequential color-based display systems, selective combination of intensity modulation, pulse width modulation, and/or the noncontiguous sequencing of primary colors. There is further an intelligent real-time dynamic manipulation of gray scale values in portions of an image that are computationally determined to be images of objects moving against a global background, so as to temporally front load or concentrate the bits comprising such moving objects and thereby further mitigate said motional artifacts using both actual and virtual aggregate pulse truncation across all primary colors being modulated.

17 Claims, 11 Drawing Sheets

FIELD SEQUENTIAL COLOR ENCODING FOR DISPLAYS

CROSS REFERENCE TO RELATED APPLICATIONS

This application claims priority to U.S. Provisional Patent Application No. 61/098,931 entitled "Field Sequential Color Encoding For Displays," filed on Sep. 22, 2008, which is herein incorporated by reference.

TECHNICAL FIELD

The present application relates to the field of field sequential color display systems, and more particularly to methods of encoding data to control the data input to individual pixels of an array of pixels and/or to control the data input to illumination light sources for enhancing the visual performance of field sequential color displays, whether in a direct-view display system or a projection-based display system.

BACKGROUND INFORMATION

This section is intended to introduce the reader to various aspects of art that may be related to aspects of the present technique, which are described and/or claimed below. This discussion is believed to be helpful in providing the reader with background information to facilitate a better understanding of the various aspects of the present technique. Accordingly, it should be understood that these statements are to be read in this light, and not as admissions of prior art.

Data encoding methods or algorithms are utilized in electronic video displays, particularly with respect to flat panel display systems to selectively control the bursts of locally transmitted primary light emitted from individual pixels disposed across the display surface. One example for the application of such encoding algorithms is a direct-view flat panel display system that uses sequentially-pulsed bursts of red, green, and blue colored light (i.e., primary colored light) emanating from the display surface to create a sequence of primary color images, also referred to as primary color subframes, that integrated together form a full color image or frame by the temporal mixing of emitted primary light that is being directed from the display surface to a viewer. A term commonly used to define this technique is called field sequential color (FSC). The human eye (i.e., human visual system) of the viewer effectively integrates the pulsed light from a light source to form the perception of a level of light intensity of each primary color (i.e., primary subframe).

In another aspect, the gray scale level generated at each pixel location on the display surface is proportional to the percentage of time the pixel is ON during the primary color subframe time, $t_{color}$. The frame rates at which this occurs are high enough to create the illusion of a continuous stable image, rather than a flickering one (i.e., a noticeable series of primary color subframes). During each primary color's determinant time period, $t_{color}$, the shade of that primary color emitted by an individual pixel is controlled by encoding data that selectively controls the appropriate fraction of $t_{color}$ (i.e., amount of time) that the individual pixel is open during the time period $t_{color}$. A term commonly used to define this technique is called pulse width modulation (PWM). For example, producing 24-bit encoded color requires 256 (0-255) shades defined for each primary color. If one pixel requires a 50% shade of red, then that pixel will be assigned with shade 128 (128/256=0.5) and stay on for 50% of $t_{color}$. This form of data encoding assumes a constant magnitude light intensity from the light source that is modulated (i.e., pulse width modulated) across the display screen by the selective opening and closing of individual pixels. Moreover, it achieves gray scales by subdividing $t_{color}$ into fractional temporal components. An individual pixel that is open refers to the pixel in an ON state (i.e., light emitting), whereas an individual pixel that is closed refers to the pixel in an OFF state (i.e., not light emitting). By making an array of pixels on a display emit, or transmit, light in a properly pulsed manner (i.e., controllably switched between ON and OFF states), one can create a full-color FSC display.

Various strategies for adjusting the color generation method for field sequential color-based display systems are geared either to the avoidance of solarization or posterization (linearity errors in creating a true uniformly sloped monotonic gray scale relationship between input and optical output of a display at any given point) and motional color breakup artifacts related to the temporal decoupling of the various primary frames comprising an image when they arrive at the retina, such that an object noticeably decomposes into its constituent primary components since those components no longer properly overlap as a consequence of relative retina-object motion during the viewing of the display. However, these various strategies induce engineering compromises since the response time of various pixel architectures may be either marginal or inadequate to generate both adequate gray scale and incorporate the artifact mitigation strategies proposed to correct for the kind of imaging errors just described. The larger a display system, or the higher its pixel density, the greater this gap between response requirements and minimal performance to deploy motional color breakup mitigation strategies becomes. However, the display industry continues to evolve toward larger, higher-density display systems because of growing industrial, military, and commercial needs in regard to information display. Because these issues have yet to be satisfactorily addressed in regard to motional color breakup in particular, the prior art has fallen short in respect to presenting a workable solution to this ongoing problem in display technology.

SUMMARY

The problems outlined above may at least in part be solved in some embodiments of the methods described herein. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Indeed, the disclosed subject matter may encompass a variety of aspects that may not be set forth below. Its sole purpose is to present some concepts in a simplified form as a prelude to the more detailed description that is discussed later.

The embodiments of the present disclosure provide various data encoding methods that reduce motional color breakup native to field sequential color displays. Some of the embodiments also provide a means to reduce demands on pixel response speeds. A first embodiment of the present disclosure is a method including modulating an intensity of the illumination means of the display system in tightly-coordinated conjunction with the temporal modulation of the pixel actuation sequence. A second embodiment of the present disclosure is a method including hard-wired front-loaded bit weighting to enhance perceived mitigation of motional artifacts using virtual aggregate pulse width truncation. A third embodiment is a method including bit-splitting to divide higher order bits (such as the most significant bit (MSB)) which have the longest temporal duration, into smaller subunits that may be distributed and interleaved (i.e., intermixed) for all three stimulus colors. Bit-splitting across all three tristimulus colored lights may be combined with the principle of intensity modulation of the illumination source disclosed in the first embodiment. A fourth embodiment is a method including distributing pulse-width-modulated temporal pulses so as to average out the relative bit weights over the entire tristimulus sequence comprising a full color frame, thereby interleaving the various tristimulus components to provide the best image quality as empirically determined by actual visual performance of such systems. A fifth embodiment is a method including distributing pulse-width-modulated temporal pulses so as to front-load all the most significant bits relative to the specific single video frame being generated. This embodiment hardwires the bit sequence from the most significant bits of all three primaries being encoded first, followed by the next most significant bits of all three primaries, and so on down to the least significant bits. A sixth embodiment is a method including real-time evaluation of each video frame being generated to determine the particular rearrangement of the bits to be displayed. In contrast to the hardwired bit sequence of the fifth embodiment, the sixth embodiment dynamically adjusts the bit sequence in light of the exigencies of each frame's program content, thereby insuring that the correct bits are truly weighted to the front of the aggregate pulse being encoded across all primaries. A seventh embodiment is a method including determining in a received plurality of video frames that an object to be displayed in a foreground of a video image is in motion relative to a background of the video image, and modifying a gray scale of the video frames associated with the object to be displayed in the foreground of the video image.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIGS. 3A-3F compare the original temporal subdivision of a single encoded primary color depicted in FIG. 3A (previously shown in FIG. 1) with: FIG. 3B which illustrates an intensity-modulated equivalent that elects to truncate total duration of the primary color pulse by postpositing the accrued time savings, and FIG. 3C which illustrates an alternate intensity-modulated equivalent that elects to redistribute the time saved over all relevant bits to reduce addressing overhead times intrinsic to the high speed operation of field sequential color-based display systems, and FIG. 3D which illustrates the aggregate pulse encoding for all three tristimulus primaries (as previously shown in FIG. 2), and FIG. 3E which illustrates an intensity-modulated variation that extends the principle of FIG. 3B to all three primaries in the full color encoded packet, and FIG. 3F which illustrates actual noncontiguous interleaving of the respective primary bits weighted such that the higher order bits appear earlier in the aggregate full color sequence of pulses, and FIG. 3G which illustrates the conflating of intensity modulation and actual noncontiguous interleaving of the respective primary bits weighted such that the higher order bits appear earlier in the aggregate full color sequence of pulses;

DETAILED DESCRIPTION

Figure 1:
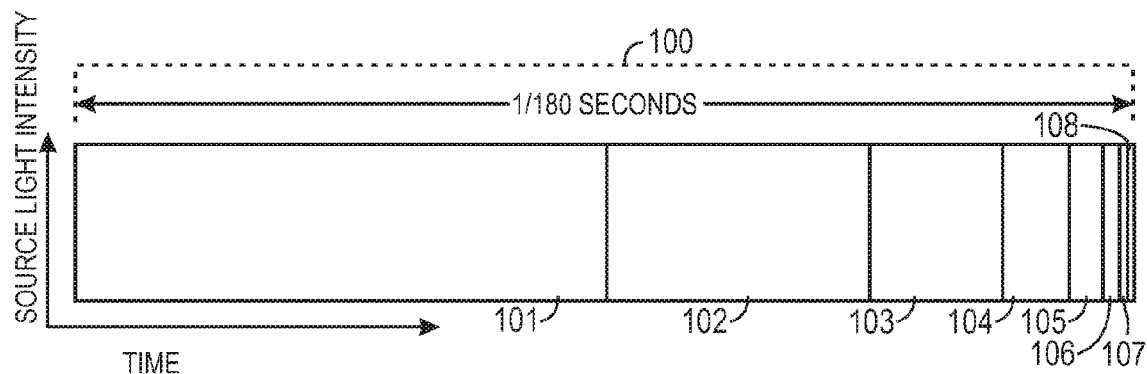
FIG. 1 illustrates a temporal breakdown of binary-weighted consecutive order bits for a single primary color according to conventional pulse width modulation methods to secure gray scales at a bit depth of 8, representing 256 different brightness levels from black to white, generated within $\frac{1}{180}$ of a second, with blackout (blanking) periods between each bit level omitted.

Among the technologies (flat panel display or other candidate technologies that exploit the principle of field sequential color generation) that lend themselves to implementation of the present disclosure is the flat panel display disclosed in U.S. Pat. No. 5,319,491, which is hereby incorporated herein by reference in its entirety. The use of a representative flat panel display example throughout this detailed description shall not be construed to limit the applicability of the present invention to that field of use, but is intended for illustrative purposes as touching the matter of deployment of the present invention. Furthermore, the use of the three tristimulus primary colors (red, green, and blue) throughout the remainder of this detailed description is likewise intended for illustrative purposes, and shall not be construed to limit the applicability of the present invention to these primary colors solely, whether as to their number or color or other attribute.

One possible display technology to be enhanced (without thereby restricting the range of applicability of the present invention) may be the current iteration of the display technology originally disclosed in U.S. Pat. No. 5,319,491, wherein pixels emit light using the principle of frustrated total internal reflection within a display architecture that leverages principles of field sequential color generation and pulse width modulated gray scale creation. In that display system, light is edge-injected into a planar slab waveguide and undergoes total internal reflection (TIR) within the guide, trapping the light inside it. Edge-injected light may comprise any number of consecutive primary colored lights, for example three primary colored lights (also referred to as tristimulus primaries), synchronously clocked to a desirable global frame rate (e.g., 60 Hz, requiring a 180 Hz rate to accommodate each of the three primaries utilized therein, namely, red, green, and blue). Pixels are electrostatically controlled MEMS structures that propel a thin film layer, hereinafter termed the "active layer", which is controllably deformable across a microscopic gap (measuring between 300 to 1000 nanometers) into contact or near-contact with the waveguide, at which point light transits across from the waveguide to the active layer either by direct contact propagation and/or by way of evanescent coupling. In other words, application of an appropriate electrical potential across the gap, with conductors associated with the slab waveguide and the active layer to be propelled/deformed, causes the high-speed motion of the active layer toward the slab waveguide; actuation is deemed completed (i.e., ON state) when the active layer can move no closer to the slab waveguide (either in itself, or due to physical contact with the slab waveguide). The active layer in contact (or near contact) with a surface of the waveguide optically couples light out of the waveguide thereby extracting light from the waveguide via frustration of total internal reflected light (FTIR). The FTIR light extracted by the active layer may be directed towards a viewer as emitted light at that pixel location.

Figure 7:
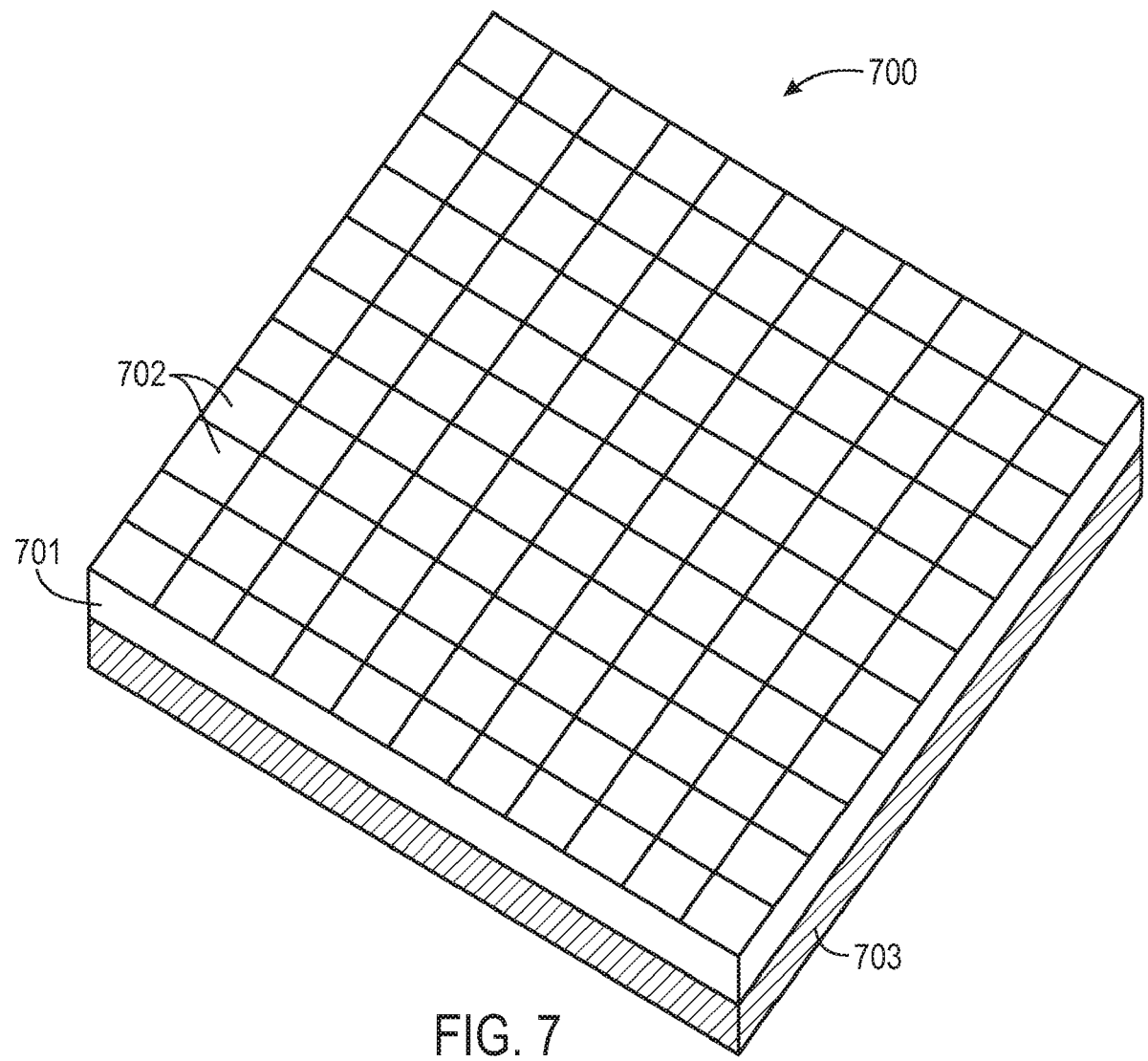
FIG. 7 illustrates a perspective view of a direct view flat panel display suitable for implementation of the present invention.

The flat panel display is thus comprised of a plurality of pixels, each pixel representing a discrete subsection of the display that can be individually and selectively controlled in respect to locally propelling the active layer bearing a suitable refractive index across a microscopic gap between ON and OFF positions thereby switching the individual pixel between ON and OFF states. FIG. 7 illustrates a simplified depiction of a flat panel display 700 comprised of a waveguide (i.e., light guidance substrate) 701 which may further include a flat panel matrix of pixels 702. Behind the waveguide 701 and in a parallel relationship with waveguide 701 may be a transparent (e.g., glass, plastic, etc.) substrate 703. It is noted that flat panel display 700 may include other elements than illustrated such as a light source, an opaque throat, an opaque backing layer, a reflector, and tubular lamps (or other light sources, such as LEDs, etc.).

A principle of operation for any of the plurality of pixels distributed across the slab waveguide involves locally, selectively, and controllably frustrating the total internal reflection of light bound within the slab at each pixel location by positioning the active layer, into contact or near contact with a surface of the slab waveguide during the individual pixel's ON state (i.e., light emitting state). To switch the individual pixel to its OFF state (i.e., light is not emitted at that pixel location), the active layer is sufficiently displaced from the waveguide by a microscopic gap (e.g., an air gap) between the active layer and the surface of the waveguide such that light coupling and evanescent coupling across the gap is negligible. The deformable active layer may be a thin film sheet of polymeric material with a refractive index selected to optimize the coupling of light during the contact/near-contact events, which can occur at very high speeds in order to permit the generation of adequate gray scale levels for multiple primary colors at video frame rates in order to avoid excessive motional and color breakup artifacts while preserving smooth video generation.

Figure 8A:
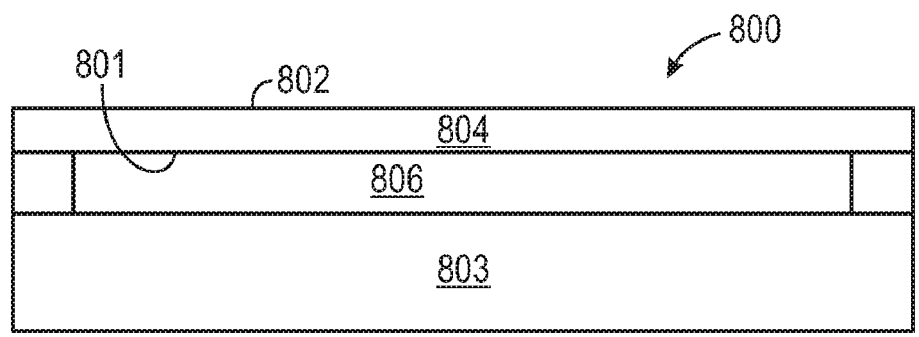
FIG. 8A is a side view schematic of a single pixel in an OFF state.
Figure 8B:
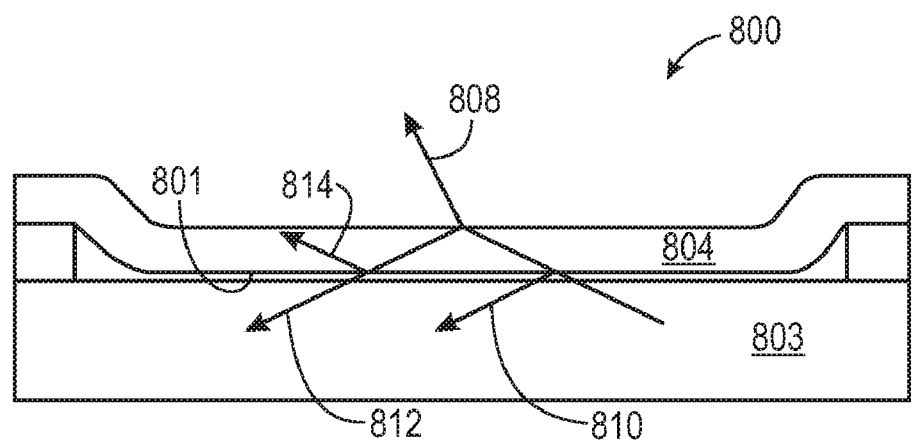
FIG. 8B illustrates the pixel shown in FIG. 8A in an ON state.
Figure 9A:
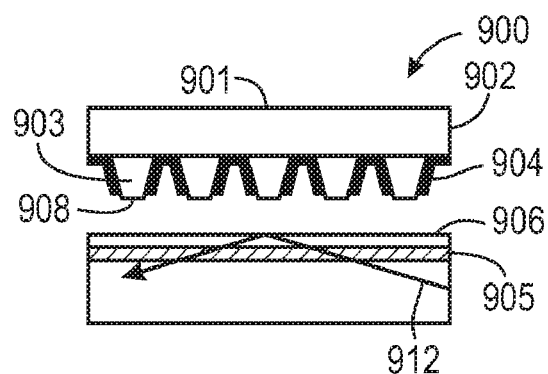
FIG. 9A is a side view schematic of a single pixel in an OFF state, wherein the pixel has collector-coupler features.
Figure 9B:
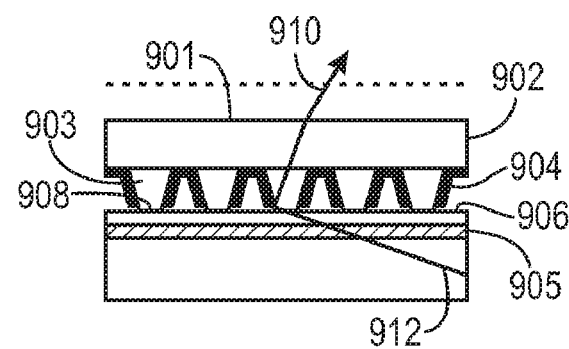
FIG. 9B illustrates the pixel shown in FIG. 9A in an ON state.

For example, FIGS. 8A and 8B illustrate a more detailed side view of one pixel 702 in an OFF and ON states, respectively. FIG. 8A shows an isolated view of a pixel 800, in an OFF state geometry, having an active layer 804 disposed in a spaced-apart relationship to a waveguide 803 by a microscopic gap 806. Each pixel 800 may include a first conductor layer (not shown) in or on a waveguide 803, and a second conductor layer (not shown) in or on the active layer 804. The pixel 800 is switched to an ON state, as depicted in FIG. 8B, but applying a sufficient electrical potential difference between the first and second conductor layers that causes the active layer 804 to deform and move towards a surface of the waveguide such that the active layer couples light out of the waveguide as illustrated by emitted light ray 808. However, there may be a certain amount of light loss due to the presence of reflected light rays 810, 812, and 814. To minimize the amount of reflected light, a plurality of collector-coupler features 903 may be disposed on a lower surface of the active layer 902, as depicted by pixel 900 in OFF and ON states illustrated in FIGS. 9A and 9B, respectively. When the pixel 900 is in the ON state (FIG. 9B), the collector-coupler features 903 interact with light waves 912 that approach the vicinity of the waveguide-active layer interface, increasing the probability of light waves to exit the waveguide and enter the active layer 902 and directing emitted light 910 towards a viewer. Since light is coupled out of the waveguide by the collector-coupler features 903, an opaque material 904 can be disposed between the collector-coupler features 903. The opaque material 904 prevents light from entering the active layer 902 at undesired locations, improving overall contrast ratio of the display and mitigating pixel cross-talk. The opaque material 904 can substantially fill the interstitial area between the collector coupler features 903 of each pixel, or it can comprise a conformal coating of these features and the interstitial spaces between them. The aperture 908 of each collector-coupler 903 remains uncoated so that light can be coupled into the collector-coupler 903. Depending on the desired use of the display, the opaque material 904 may be either a specific color (e.g., black) or reflective.

The use of a representative flat panel display example throughout this detailed description shall not be construed to limit the applicability of the present invention to that field of use, but is intended for illustrative purposes as touching the matter of deployment of the present invention. Furthermore, the use of the three primary colors (red, green, and blue) throughout the remainder of this detailed description is likewise intended for illustrative purposes, and shall not be construed to limit the applicability of the present invention to these primary colors, whether as to their number or color or other attribute.

As stated previously, certain field sequential color displays, such as the one illustrated in FIG. 7, exhibit undesirable visual artifacts under certain viewing conditions and video content. The cause of such harmful artifacts proceeds from relative motion of the observer's retina and the individual primary components of a given video frame during the successive transmission in time of each respective subframe primary component. The display of FIG. 7 serves as a pertinent example that will be used, with some modifications for the purpose of generalization, throughout this disclosure to illustrate the operative principles in question. It should be understood that this example is provided for illustrative purposes as a member of a class of valid candidate applications and implementations, and that any device, comprised of any system exploiting the principles that inhere in field sequential color generation, can be enhanced with respect to artifact reduction or suppression where said artifacts stem from the primary components comprising a video frame falling on different geometric regions of the observer's retina due to relative motion of retina and display.

Figure 10:
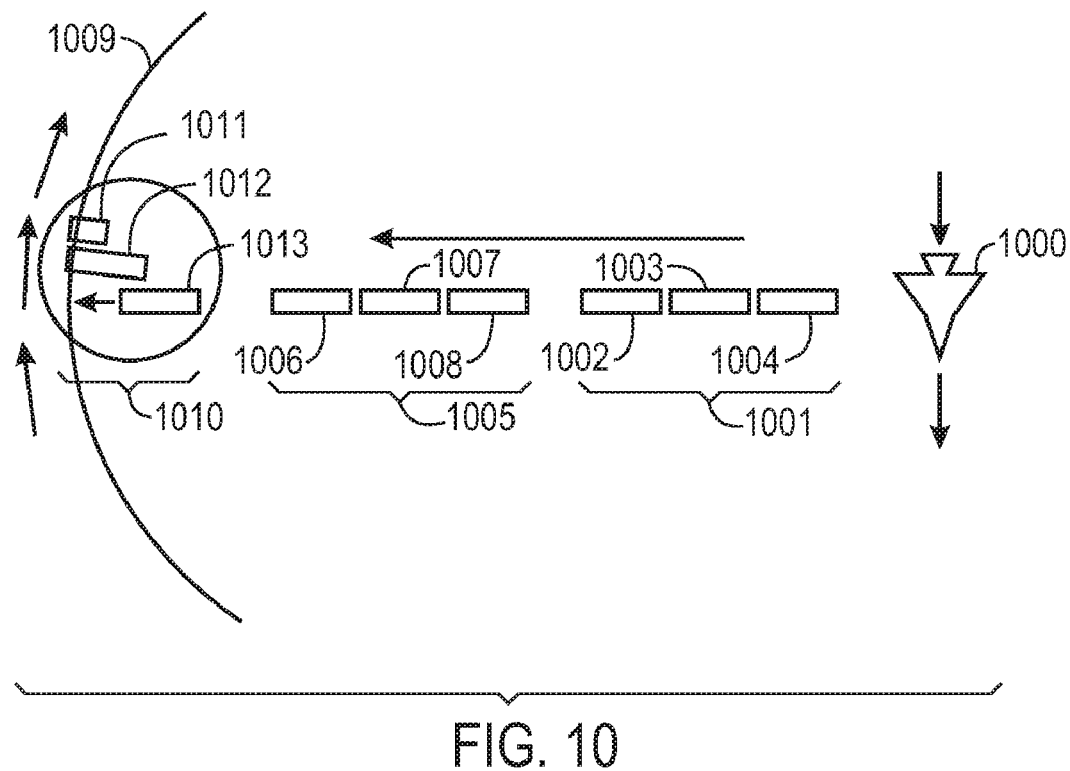
FIG. 10 illustrates what causes the phenomenon of color image breakup when an observer views an image generated using field sequential color generation techniques during rotational motion of the observer's eye.

FIG. 10 illustrates in accordance with an embodiment of the present disclosure the general phenomenon of color image breakup in FSC displays. The information being displayed on the display surface during a given video frame proceeds to the observer's retina 1009 as a series of collinear pulses 1001 and 1005 comprised of the respective consecutively-generated primary information constituting each video frame. So video frame information for a frame 1001 is composed of temporally separated primaries 1002, 1003, and 1004, while another video frame 1005 (one frame prior in time to frame 1001) is likewise composed of temporally separated primaries 1006, 1007, and 1008. The information contained as an array of pulse width modulated colored light for each primary color arrives at the retina 1009 to form an image. If the primary subcomponents 1006, 1007, and 1008 arrive at the same location on the retina, the eye will merge the primaries and perceive a composite image without any color breakup. However, if the retina 1009 is in rotational motion, then the phenomenon at the retina follows the pattern of video frame 1010, where the individual primary components 1011, 1012, and 1013 fall on different parts of the retina, causing the color breakup artifact to be perceptible.

Figure 11A:
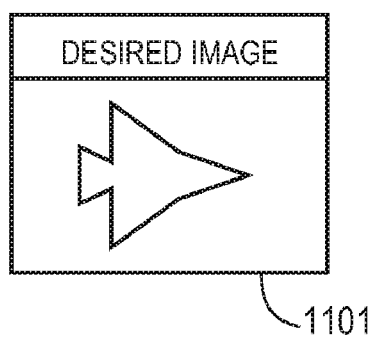
FIG. 11A illustrates the perceived image that is desired irrespective of eye rotation and/or other motion in accordance with an embodiment of the present invention.
Figure 11B:
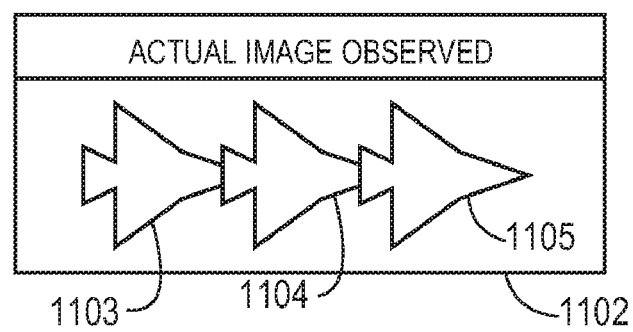
FIG. 11B illustrates the phenomenon of color image breakup by depicting a perceived image due to eye rotation and/or other motion.

In FIGS. 11A and 11B, illustrate the intended image depicted in FIG. 11A as compared to the actual perceived image depicted in FIG. 11B. For example, if the primary components comprising video frame 1010 all arrived at the same location on the retina, the eye would merge the primary subframes to accurately form the composite image 1000, which in this example is an image of a gray airplane. However, if the eye is in rotational motion, retina 1009 moves with respect to the consecutive primary colored images (i.e., primary subframes) comprising video frame 1010, such that 1011, 1012, and 1013 (the primary components comprising the entire frame 1010) fall at different locations on retina 1009, resulting in the perceived image 1102, where the separate primary components 1103, 1104, and 1105 are perceived no longer as fully overlapping, but rather distributed across the field of view in a dissociated form, as shown. Recovery of the intended image 1101 is the goal of artifact suppression, whereby the splayed, dissociated image 1102 is reduced or suppressed by virtue of extirpation of the cause of such dissociation.

Color display systems that utilize a temporally-based color generation method may require the means to mitigate, suppress, and control motional artifacts arising from the temporal decoupling of the primary color constituents comprising an image due to these constituents arriving at different points on the observer's retina due either to rotary motion of the eye or to the eye's tracking of a foreground object in the video image that is in motion relative to the perceived background of that image. The various embodiments of the present disclosure provide encoding methods to mitigate color breakup motional artifacts and/or reduce demands on pixel response speeds. The present invention may be implemented on a host of display systems (direct view or projection-based) that could be expected to use field sequential color encoding techniques and thus would be highly desirable and lead to improved image generation by system architectures based on the field sequential color paradigm.

To provide a better understanding of the encoding methods of the present disclosure, FIG. 1 illustrates the conventional breakdown of a single primary color into pulse width modulated constituents that stand in binary proportions one to another. The three tristimulus primary colored lights used in field sequential color displays are red, green, and blue, and displays using field sequential color use at least these three primaries for image generation. A conventional frame rate for video frames in such displays is 60 frames per second (60 fps) for all three colors, which means that one-third of this time period of $1/60^{th}$ of a second is allocated to each of the tristimulus primaries: $1/180^{th}$ of a second for red, for green, and for blue, totaling $1/60^{th}$ of a second. FIG. 1 illustrates one of these primary colored light (e.g., red) and its duration, referred to as a primary pulse duration 100, and how it is further subdivided into smaller fractions. For 8-bit color, which provides $2^8$ different intensities or gray scale levels for the primary color (256 gray scales), it is appropriate to subdivide the entire pulse of $1/180^{th}$ second into eight fractions referred to as bits 101, 102, 103, 104, 105, 106, 107, 108. Wherein, the second bit 102 is a second subdivision lasting ½ the primary pulse of bit 101 (i.e., the first subdivision), the third bit 103 is a third subdivision lasting ¼ the primary pulse of bit 101, the fourth bit 104 is a fourth subdivision lasting ⅛ the primary pulse of bit 101, the fifth bit 105 is a fifth subdivision lasting 1/16 the primary pulse of bit 101, the sixth bit 106 is a sixth subdivision lasting 1/32 the primary pulse of bit 101, the seventh bit 107 is a seventh subdivision lasting 1/64 the primary pulse of bit 101, and the eight bit 108 is an eighth subdivision lasting 1/128 the primary pulse of bit 101. In other words, the duration of each bit 102 through 108 is a consecutive halving of the previous bit, wherein bit 108 represents 1/256 of the original primary pulse duration also referred to an aggregate primary pulse 100. Any one of 256 different values of intensity based on pulse width modulation (the amount of time light is allowed to pass through any given pixel being independently modulated according to this schema) can be generated by appropriate actuation of the pixel to either an ON or OFF state during the eight time periods of bits 101 through 108. If a given pixel is OFF for all eight time periods, the gray scale level being displayed for that pixel is zero (no intensity of the given primary), and if the pixel is ON (i.e., open) for all eight subdivisions, the intensity is maximized for the pixel being so actuated. By setting the temporal subdivisions in consecutive 2-to-1 binary relationships, the encoding of digital information in temporal form to generate gray scale values via PWM is made particularly efficient from the standpoint of drive electronics exigencies, especially as compared to subdividing the $\frac{1}{180}^{th}$ aggregate full pulse 100 into 256 evenly-divided subdivisions, which requires 32 times as many addressing cycles as is taught in FIG. 1. The horizontal axis represents time passing from left to right, while the vertical axis represents the intensity of the illumination source (i.e., light source) feeding at least one (if not all) pixels being actuated according to the principles of display operation to enable field sequential color image generation.

Figure 2:
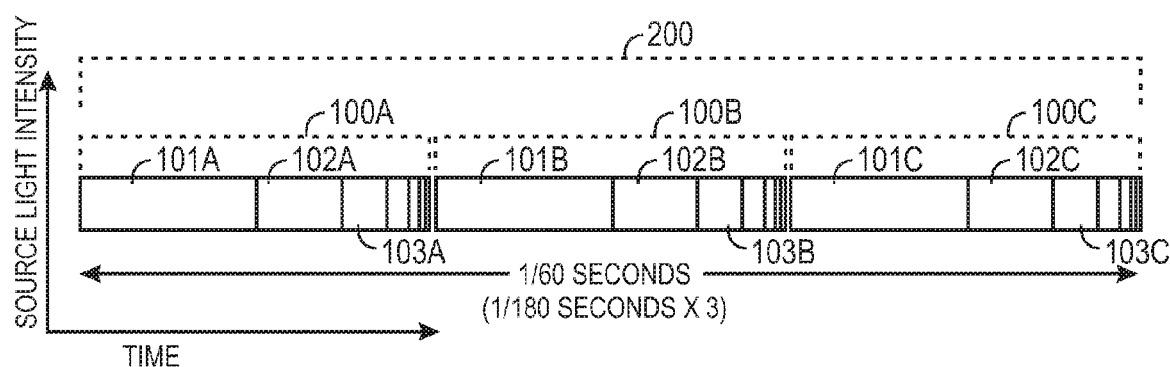
FIG. 2 illustrates a concatenation of three consecutive 8-bit gray-scale units of $\frac{1}{180}^{th}$ of a second in duration such as shown in FIG. 1, with the first block representing one tristimulus color (e.g., red), the second block representing the second tristimulus color (e.g., green), and the third block representing the third tristimulus color (e.g., blue), such that the entire temporal period shown of $\frac{1}{60}^{th}$ of a second duration represents the switching template required to generate full color images on a display at a total color bit depth of 24 (approximately 16.7 million colors)

FIG. 2 illustrates how the three consecutive primaries (of $\frac{1}{180}^{th}$ second duration each) are arrayed sequentially, one after another, to form a full color video frame of $\frac{1}{60}^{th}$ of a second duration (i.e., $\frac{1}{180}^{th}$ of a second per color primary multiplied by three total color primaries being modulated) in a conventional FSC display. A first primary color that lasts for a primary pulse duration 100a has an 8-bit gray scale decomposition as previously shown by the single primary color light that lasts for a primary pulse duration 100 in FIG. 1. The first primary color represented by duration 100a may be the color red, although the present invention need not be tied to any one of the six possible combinations of the three tristimulus primaries that provide illumination to the pixels (which are turned on or off (i.e., switched between ON and OFF states) according to the requirements of the color frame as encoded according to the sequence of bits for each primary shown in FIG. 2). The first primary pulse duration 100a is followed by a second primary pulse duration 100b that illuminates a different color (e.g., green) for an identical duration of $\frac{1}{180}^{th}$ of a second, and a third primary pulse duration 100c that illuminates a different color (e.g., blue) for an identical duration of $\frac{1}{180}^{th}$ of a second. The consecutive sequential series of tristimulus primaries (i.e., three primary colored light) and their possible binary subdivisions is referred to as an aggregate tristimulus pulse 200. Because in the example shown each primary color is subdivided into 8 bits (256 possible gray scales), the aggregate color capability for this example is 24-bit color (over 16.7 million possible colors based on the gray scales available for each of the three tristimulus primaries of red, green, and blue).

In the two examples illustrated in FIGS. 1 and 2, there is no attempt to modulate the intensity of the illumination sources feeding the display system. All gray scales are generated solely by temporal considerations: the pulse width modulation of light flux by way of pixel actuation and deactivation is adequate to create and control digital gray scale values independently at each pixel for a suitably configured display system. In another aspect, it should be noted that blanking periods may be inserted between each of the subdivisions to accommodate driver timing issues (e.g., to load the pixel data) and illumination transient response issues to insure linearity of response, but these possible blanking states (where the illumination means are briefly shut off at the boundaries between individual gray scale bits, or between consecutive primary colors being displayed) are omitted in the figures of the present disclosure since their possible inclusion is assumed as likely, without thereby being necessarily an intrinsic part of the present disclosure and its diverse methods for meeting the existing needs in the art to mitigate motional artifacts and/or relax pixel response time requirements. The methods of the present disclosure are applicable whether or not such blanking periods are present.

In a first embodiment, modulating an intensity of the illumination means of the system in tightly-coordinated conjunction with the temporal modulation of the pixel actuation sequence permits either (a) truncation of the aggregate pulse defining any given primary color full-length frame (all bits accounted for), such that by asynchronous distribution the entire series of tristimulus pulses would be thereby truncated to mitigate motional artifacts, or (b) said sequence permits distribution of the time gained (by using such synchronized intensity modulation within the illumination system as a surrogate for temporal duration for the most significant bits) amongst all bit durations comprising the total gray scale makeup of the full primary frame so as to relax the transient response requirements upon the pixels at the heart of the display architecture. Further, a combination of these two desirable effects (temporal truncation and reduced demands upon pixel speed) is also possible under this embodiment.

Figure 3A:
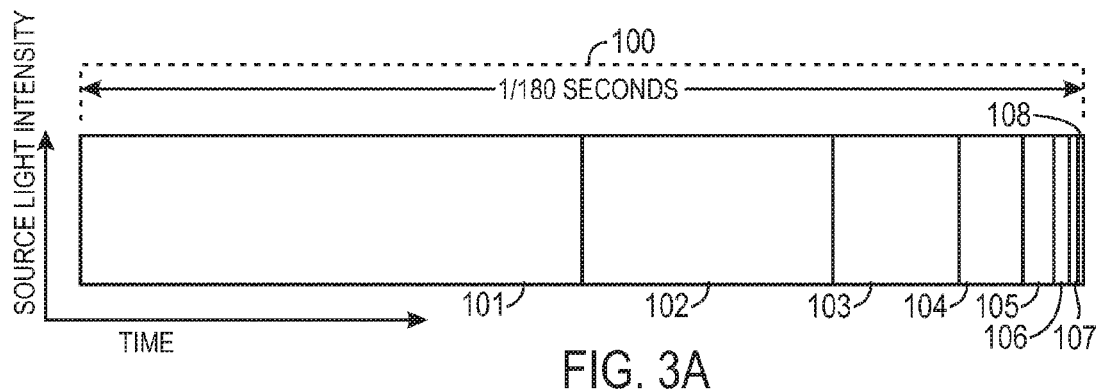
Figure 3B:
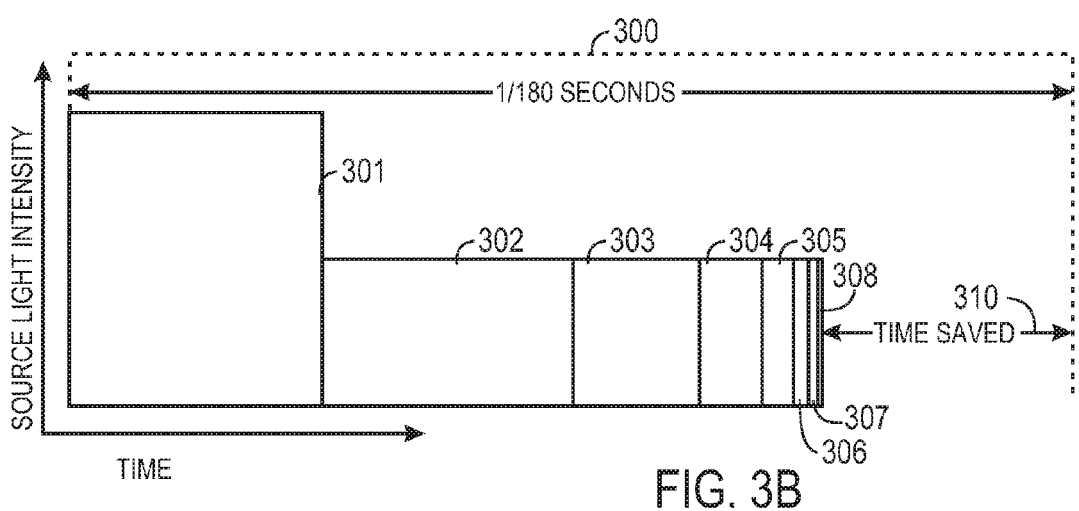
Figure 3C:
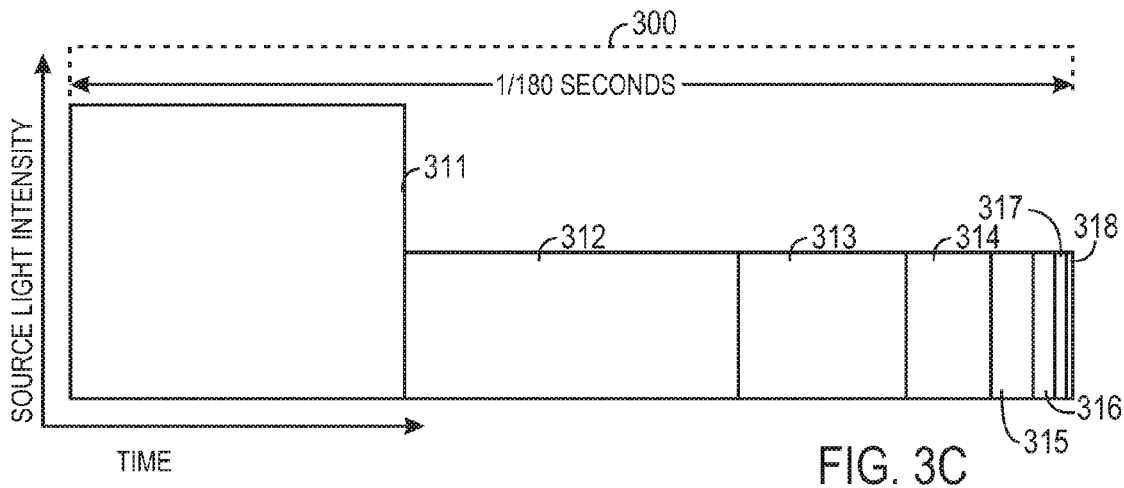

In particular, the first embodiment provides a method for combining intensity modulation with PWM to achieve aggregate pulse truncation to mitigate color motional breakup artifacts, as illustrated in FIG. 3B, or to relax pixel transient response requirements as illustrated in FIG. 3C. For comparison purposes, FIG. 3A again displays the fundamental pulse 100 as previously depicted in FIG. 1, showing that the entire pulse of the primary color has an overall duration of $\frac{1}{180}^{th}$ of a second. It is possible, however, to shorten the amount of time that the primary color is displayed. Shortening of the display time for a given gray scale value, which serves to truncate the pulse, is a valuable tool for mitigating the effects of motional color breakup. The temporal decoupling of the constituent primaries comprising an image generated on a field sequential color display can be reduced when the various temporal components of the frame arrive closer together in time (due to aggregate pulse truncation). The means of shortening the display time without affecting the desired flux being displayed by any given pixel involves amplitude modulation of the intensity being displayed through a given pixel. By setting up the FSC system so that the global illumination means operates at, for example, double its normal intensity during the most significant bit being displayed, the pulse width of that most significant bit can be halved without affecting its luminous flux. The most significant bit 101 in the non-intensity-modulated primary pulse shown in FIG. 3A becomes truncated in FIG. 3B as bit 301. Bits 102, 103, 104 through 108 of FIG. 3A therefore become bits 302, 303, 304 through 308 of FIG. 3B. These latter seven bits (i.e., pulses) are unchanged; however, the first pulse of the full set of eight subdivisions, i.e., the most significant bit 101 of FIG. 3A, now becomes bit 301 of FIG. 3B that exhibits half the temporal duration but double the intensity of the global illumination system feeding the pixels comprising the display. The area of bit 101 in FIG. 3A and the area of bit 301 in FIG. 3B are identical, and this area (representing the product of intensity and time) represents the perceived intensity of the pulse based on total light flux passing through the pixel(s) in question. Note, however, that with the halving of the duration of bit 101 (such that the temporal of duration of bit 301 is now equal to that of bit 302, rather than twice the duration of bit 302 as would have been required had intensity modulation not been integrated with pulse width modulation), there is extra time available for the overall primary pulse to be encoded, this extra time is referred to as a time savings 310. In this example, the time savings 310 is equal to the duration of bit 302 (which is equivalent to the time duration of bit 102 in FIG. 3A). This saved time 310 may be used to truncate the aggregate pulse. In FIG. 3B, the overall pulse is shortened by the duration of time savings 310. Truncation of the aggregate pulse for any one or more of the primary color full-length frames (e.g., each of the primary pulses of light; red-green-blue) may be employed such that each of the tristimulus pulses would be thereby truncated to mitigate motional artifacts.

Alternatively, FIG. 3C illustrates that the additional time provided by time savings 310 is not used to shorten the aggregate pulse and create dead space after 308 as displayed in FIG. 3B, but rather, the duration of the time savings 310 may be equally distributed among all eight binary subdivisions 311 through 318. This may be appropriate where the speed of pixel response becomes a factor in displaying the least significant bits (shortest pulse durations) required to generate certain gray scale values. In the case of FIG. 3C, the primary color being displayed (e.g., red) is just as long as was displayed in FIG. 3A, but the timing demands on the pixels are relaxed because intensity modulation of the most significant bit 311 has bought the system some extra safe operating area in regard to temporal demands upon the pixel shuttering mechanisms native to the display architecture in question. Whereas displays that do not have the temporal demands, the dynamic range of the light output will increase due to the resulting increase of overall pixel intensity.

It should be noted that intensity modulation as shown in FIGS. 3B and 3C is not limited to simply doubling the intensity for the most significant bit 301, 311. One could just as easily quadruple the intensity for the most significant bit 301, 311 and double the intensity for the next most significant bit 302, 312, thereby gaining even greater temporal gains, which can either translate to a shorter overall pulse duration for all 8 bits (as sought in FIG. 3B) or further reduce high speed actuation requirements on the pixels (as implemented in FIG. 3C). This embodiment allows for any level of coordinated segmentation between controlled intensity modulation and pulse width modulation to secure the correct binary proportions of net flux reaching the observer's retinas while viewing the display being so enhanced.

Figure 3D:
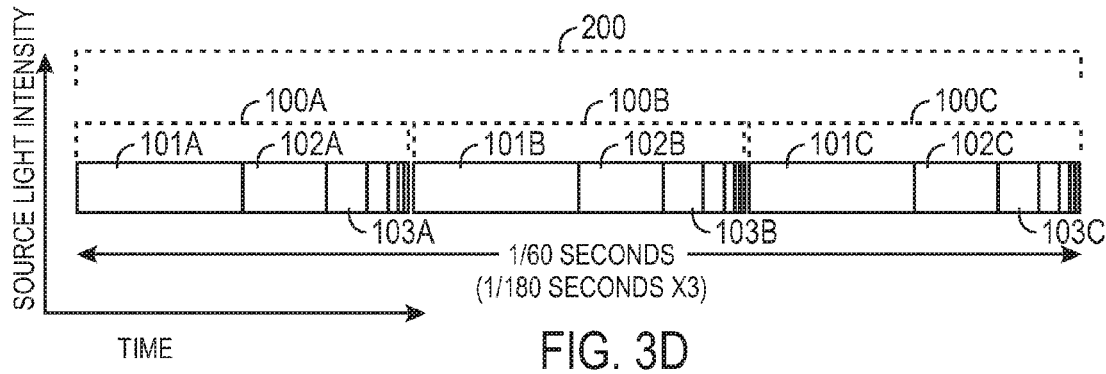

For comparison purposes, FIG. 3D again illustrates the entire three-primary frame of 1/60$^{th}$ second duration, as previously depicted in FIG. 2, capable of exhibiting an aggregate total color bit depth of 24 bits (i.e., 8 bits per primary multiplied by three tristimulus primary colors (denoted by lower case "a", "b", and "c") being modulated sequentially in time. First primary pulse duration 100a, second primary pulse duration 100b, and third primary pulse duration 100c would represent, for example, the respective red, green, and blue temporal subframes of 1/180$^{th}$ second each duration comprising the entire full color frame 200 in FIG. 3D. When intensity modulation is applied to all three primary colored lights a, b, c comprising the full color frame, as in FIG. 3E, the durations (i.e., pulse widths) of most significant bits 301a, 301b and 301c are halved in duration, as compared to 101a, 101b, and 101c depicted in FIG. 3D, so that the respective total primary pulse durations 300a, 300b and 300c are individually truncated and thus truncated in the aggregate, with the time savings by a duration referred to as a time savings 320 depicted in FIG. 3E. As illustrated in this example, the time savings 320 is equal to three times the duration of pulse 302a. This time savings 320 may be utilized as a blanking period during which black is displayed to reduce decoupling of the primary components as they fall on the observer's retina.

A second embodiment of the present disclosure provides a method to create hard-wired front-loaded bit weighting to enhance perceived mitigation of motional artifacts using virtual aggregate pulse width truncation. As illustrated in FIG. 3F, the temporal rearrangement of the various bit weights comprising the total aggregate color gray scale to be produced by a given pixel during a full frame can be conducted along lines geared toward favoring the front-loading of the most significant bits 101a, 101b, and 101c corresponding to each of the primary colored lights a, b, c, as compared to the embodiment previously described with respect to FIG. 3D wherein the most significant bits 101a, 101b, and 101c are distributed in separate first, second, and third primary pulse durations 100a, 100b, and 100c respectively. Combining bit-rearranging with non-contiguous primary processing, as illustrated in FIG. 3F, may position the same bit weights for each of the three primary colors (a, b, c), contiguous with one another thereby forming a first triplet 322 of all three most significant bits 101a, 101b, 101c. Likewise, the second most significant bits 102a, 102b, 102c are similarly aggregated as a second triplet 324, the third most significant bits 103a, 103b, 103c are similarly aggregated as a third triplet 326, the fourth most significant bits are similarly aggregated as a fourth triplet 328, the fifth most significant bits are similarly aggregated as a fifth triplet 330, the sixth most significant bits are similarly aggregated as a sixth triplet 332, the seventh most significant bits are similarly aggregated as a seventh triplet 334, and the eighth most significant bits (i.e., least significant bits) are similarly aggregated as an eighth triplet 336, representing each descending bit weight being encoded according to the binary weighting paradigm defined at the outset. A display system must be capable of displaying bits in such a sequence, including a noncontiguous primary color light a, b, c processing sequence (where noncontiguous would be defined as a sequence violating the standard red-green-blue or similar sequential illumination of the display system to provide light to the matrix of pixels on the display surface). In this embodiment, there is no attempt to modulate the intensity of the illumination sources feeding the display system. All gray scales are generated solely by temporal means such as pulse width modulation of light flux by way of pixel actuation and deactuation. PWM is adequate to create and control digital gray scale values independently at each pixel for a suitably configured display system.

Figure 3E:
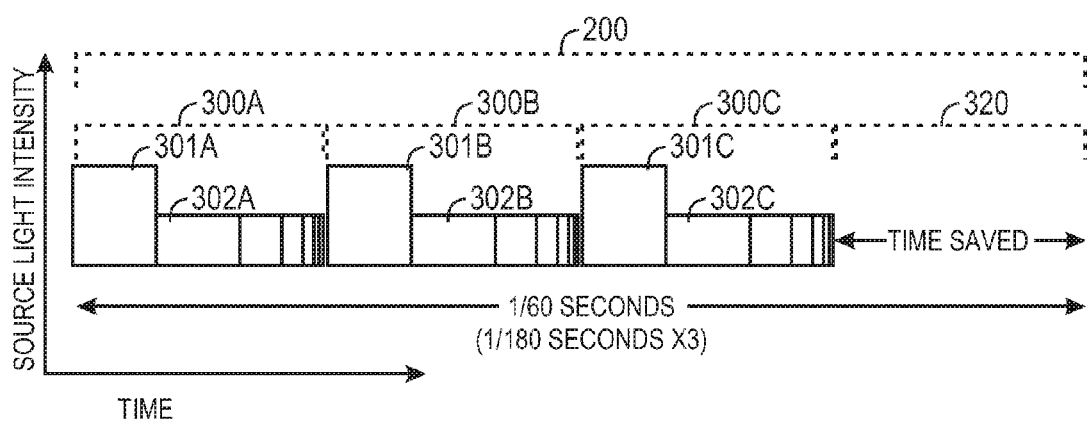
Figure 3F:
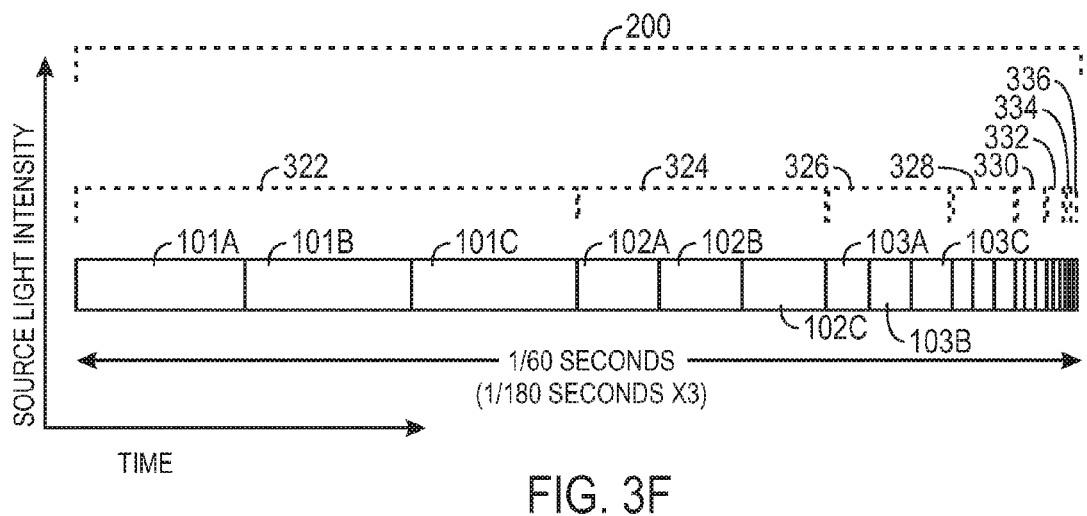
Figure 3G:
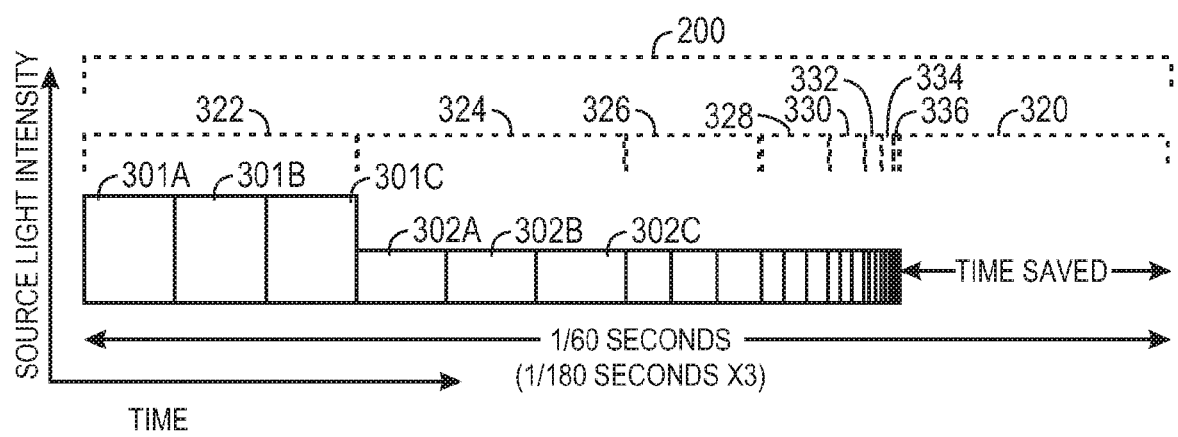

As shown in FIG. 3G as compared to FIG. 3E, the temporal rearrangement of the various bit weights comprising the total aggregate color gray scale to be produced by a given pixel during a full frame can be conducted along lines geared toward favoring the front-loading of the most significant bits. Whereas in FIG. 3E, the most significant bits 301a, 301b, and 301c are distributed in separate first, second, and third primary pulse durations 300a, 300b, and 300c, respectively, in the embodiment illustrated in FIG. 3G the same bit weights are contiguous with one another, forming a first triplet 322 of all three most significant bits 301a, 301b, 301c. The second most significant bits 302a, 302b, 302c are similarly aggregated as a second triplet 324, the third most significant bits representing a third triplet 326, the fourth most significant bits representing a fourth triplet 328, and so on such that the fifth, sixth, seventh and eighth most significant bits are rearranged into fifth, sixth, seventh, and eighth triplets 330, 332, 334, 336 representing a triplet for each descending bit weight being encoded according to the binary weighting paradigm defined at the outset. A display system must be capable of displaying bits in such a sequence, including a noncontiguous primary color light processing sequence mitigates motional artifacts native to field sequential color display systems. In subsequent embodiments it will be noted that manipulation of such color sequences becomes an important adjunct to mitigating motional color artifacts, particularly where the transient response of the pixels is already near their performance limits.

Figure 4A:
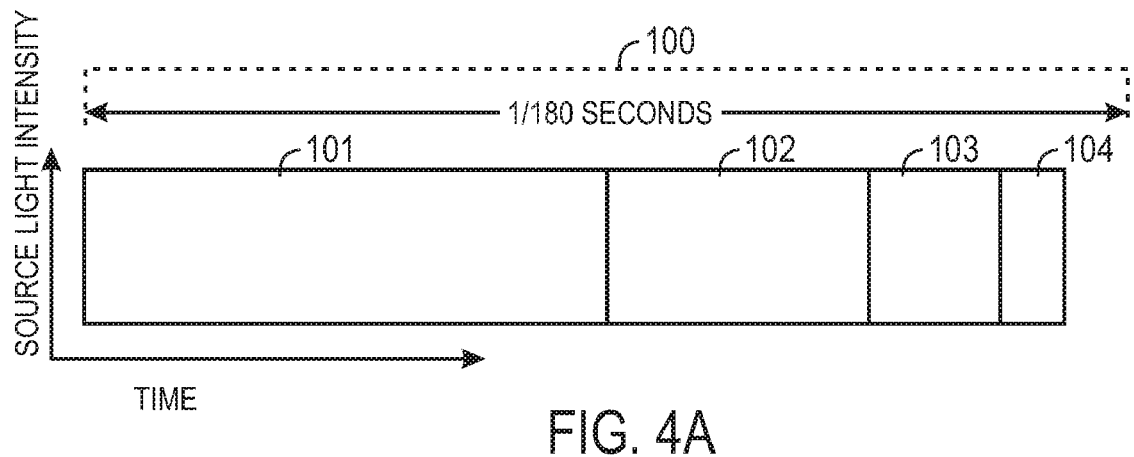
FIG. 4A illustrates a subset of the pulse width modulated durations for a single primary color shown in FIG. 1, namely, the four highest order bits, omitting the four lowest order bits for illustrative purposes.
Figure 4B:
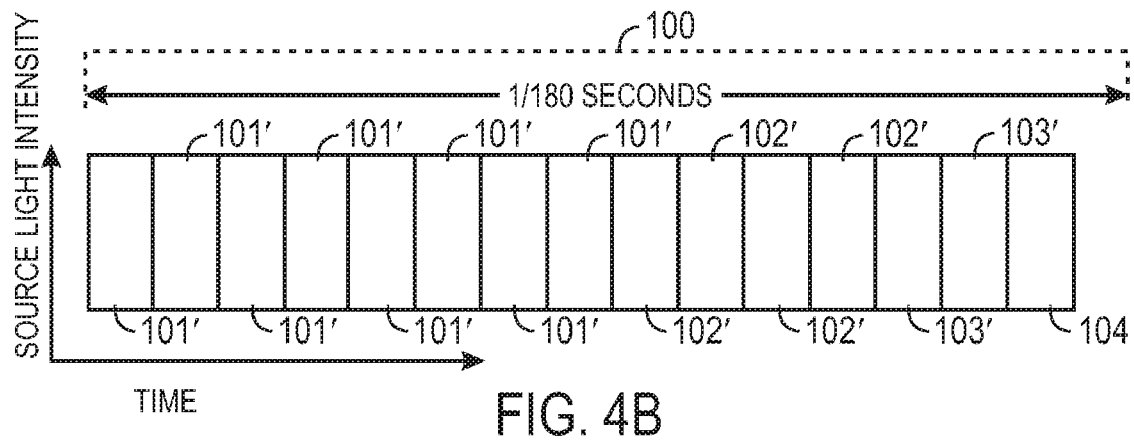
FIG. 4B illustrates the splitting of the durations for a single primary color shown in FIG. 4A into fractional subdivisions bearing the same duration as the smallest illustrated bit width, without any rearrangement of the bits in terms of sequence.
Figure 4C:
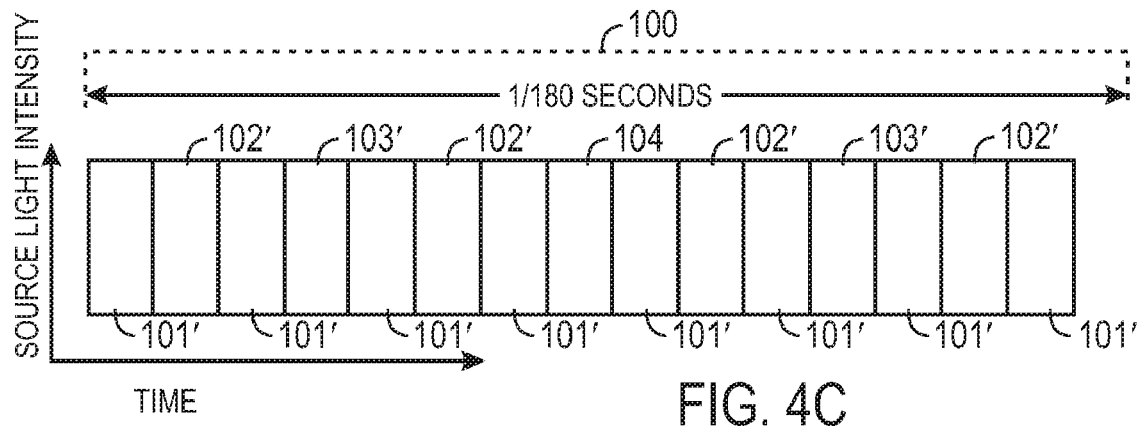
FIG. 4C illustrates the rearrangement of the split bits for a single primary color previously shown without rearrangement in FIG. 4B such that the higher order bits are distributed as evenly as possible over the entire duration of the primary color generation time.

In a third embodiment, bit-splitting is deployed to divide higher order bits (e.g., the most significant bit (MSB) 101), which have the longest temporal duration, into smaller sub-units that total the duration of the original pulse of MSB 101. The split bits may be distributed and interleaved for all three stimulus colors a, b, c, which are thus intermixed (unlike prior art bit-splitting which is limited to bit-splitting within a single primary due to the exigencies of color wheel operation native to the displays incorporating such techniques). FIG. 4A illustrates the four most significant bits 101, 102, 104, and 104 of the original primary color binary weighting paradigm set forth in FIG. 1. FIG. 4B illustrates how the larger, more significant bits (e.g., bits 101, 102, 103 illustrated in FIG. 4A) can be subdivided. In this example, bits 101, 102, and 103 are all subdivided into multiples of the duration set for the fourth most significant bit 104, as shown in FIG. 4B. The value of bit splitting as a method is not properly realized until the bits forming the single primary color gray scale are rearranged, such as illustrated in FIG. 4C, which attempts to provide an averaged weighting of each of the respective bit weights across the entire $\frac{1}{180}^{th}$ of a second for the single primary color pulse duration 100. In FIGS. 4B and 4C, there are eight fractional durations 101' comprising the most significant bit 101, four fractional durations 102' comprising the second most significant bit 102, two fractional durations 103' comprising the third most significant bit 103, and only one duration 104 comprising the fourth most significant bit 104. The lower order bits (bits 105, 106, 107, and 108) are omitted for the sake of illustrative clarity, although they would arguably be handled in a similar fashion according to this method.

In this third embodiment, bit-splitting across all three tristimulus colors may be combined with the principle of intensity modulation of the illumination source disclosed in the first embodiment to secure superior optical performance while gaining either (a) additional aggregate pulse width truncation to further mitigate motional artifacts, (b) distribute any time saved due to the addition of intensity modulation among all bits being temporally generated to reduce the demand on pixel speeds in the display architecture, or (c) a combination of both motional artifact mitigation and reduction of pixel response requirements.

Figure 5A:
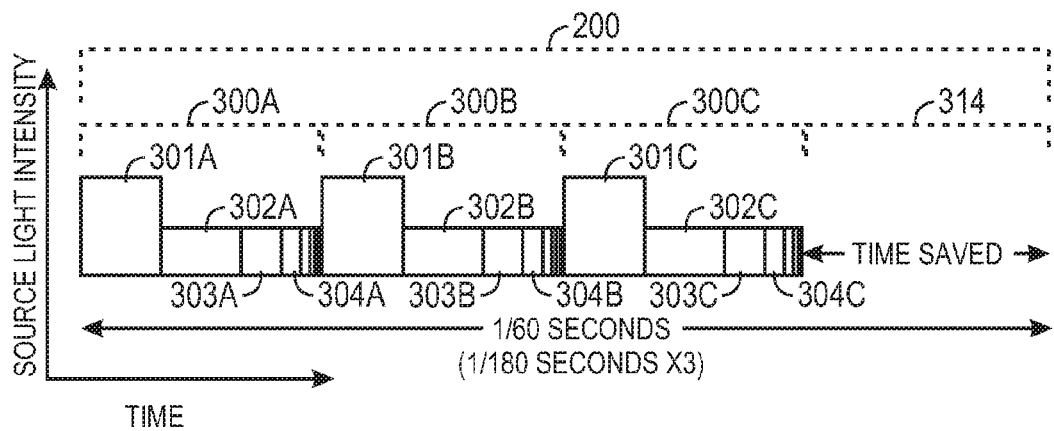
FIG. 5A illustrates the full color cycle for all three primary colors as formerly shown in FIG. 3E with intensity modulation applied to the sequence, with only the four highest order bits being annotated in the figure.
Figure 5B:
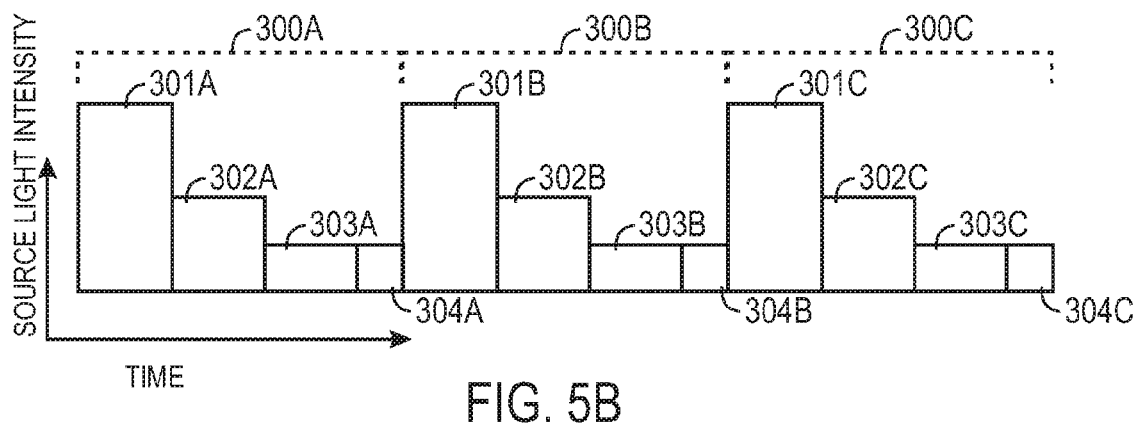
FIG. 5B illustrates the mixing of several levels of intensity modulation and pulse width modulation as applied only to the four highest order bits for the entire color cycle comprised of all three primary colors.

An embodiment of the present invention teaches the coordinated modulation of light source intensity with pulse width modulation to facilitate aggregate pulse width truncation. FIG. 5A reproduces the primary time savings already disclosed in FIG. 3E, while FIG. 5B (for the sake of clarity) omits the four lowest order bits to set forth a variation on an intensity-modulated method as applied to the four highest order bits, namely 301a, 302a, 303a, and 304a. Note that the area of each of these respective bit weights represents the potential flux that can be generated by any given pixel in question (if the pixel were turned on for all such segments the flux would be actual). In FIG. 5B, note that the respective primaries are still treated contiguously, such that 300a represents one primary color light pulse being modulated by intensity and pulse width modulation, and 300b and 300c represent the other two primary colored lights.

Figure 5C:
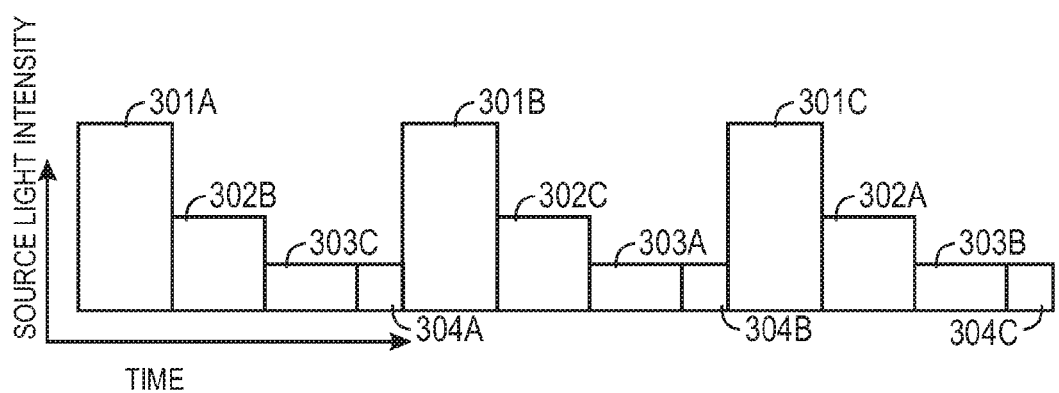
FIG. 5C illustrates the interleaving of the various intensities and pulse widths shown in FIG. 5B so as to best average out the intensity for any given primary color across the entire aggregate pulse duration for the entire three-primary video frame being displayed.

A fourth embodiment is a method that may include combining intensity modulation with PMW to create averaged primary weights across the aggregate full color three primary frame duration via noncontiguous primary colored light sequencing. The fourth embodiment of the present disclosure distributes conventional pulse-width-modulated temporal pulses so as to average out the relative bit weights over the entire tristimulus primary color sequence comprising a full color frame, thereby interleaving the various tristimulus primary color components to provide the best image quality as empirically determined by actual visual performance of such systems. As shown in FIG. 5B, the respective primary colored light durations 300a, 300b, and 300c are contiguous with one another. However, provided a display system (for example, the display disclosed in U.S. Pat. No. 5,319,491) is capable of noncontiguous primary color light sequencing, further possibilities for modifying and/or improving the visual quality of the video images being transduced by the display system can be marshaled. In this embodiment, the primary colored light a, b, c may be interleaved as illustrated in FIG. 5C so as to provide average potential intensity across the entire aggregate three-primary pulse duration of $\frac{1}{60}^{th}$ of a second. This differs from the effects of bit-splitting-based averaging disclosed in FIG. 4C, which is limited to gray scale generation within a single primary color, and does not involve the interleaving of bit weights across color boundaries such as is shown in FIG. 5C, where it should be noted that the suffixes refer to the three primaries (the most common association would be a for red, b for green, and c for blue, so that 302b would represent the second most significant bit for the primary color green). Note that the ordering of the bits in FIG. 5C no longer follows the conventional sequence of red-green-blue, and so does not lend itself to displays that are tied to sequential processing of the respective primaries (such as obtains in the case of color-wheel-based illumination systems used in projection-based displays). In this instance, FIG. 5C secures the benefits of the approach alluded to in FIG. 4C, except that FIG. 5C employs coordinated manipulation of illumination intensity to the display, the interleaving of the primary colors, and the implementation of noncontiguous sequencing to insure maximum averaging of light energy for any given primary over the entire three-primary duration of $\frac{1}{60}^{th}$ of a second, which was arbitrarily selected at the outset as a reasonably nominal frame rate for a field sequential color display system.

A fifth embodiment is a method that may include combining intensity modulation with PWM to create hard-wired front-loaded bit weighting to further enhance perceived mitigation of motional artifacts using virtual aggregate pulse width truncation. The fifth embodiment of the present disclosure distributes conventional pulse-width-modulated temporal pulses so as to front-load all the most significant bits relative to the specific single video frame being generated, with the lower order bits contributing less information to the image being generated being relegated to the end of the aggregate tristimulus colored light pulse comprising the entire color frame. By front-loading (or back-loading, which would be optically equivalent to the human eye: the benefit arises from grouping the most important pulse of all colors as closely as possible) the most important bits, the image undergoes virtual truncation due to such temporal rearrangement of the pulses comprising it. This embodiment hardwires the bit sequence from the most significant bits of all three primary colored lights being encoded first, followed by the next most significant bits of all three primary colored lights, and so on down to the least significant bits. Such virtual truncation can serve to mitigate motional breakup artifacts without, in fact, truly truncating the pulse in time, by means of such synchronous hardwired weighting of the respective bits to be displayed. The bulk of the information comprising the important features of the frame are displayed first, and the less important features are displayed later in time (and are likely to represent lower image value portions of the display and thus will be more difficult to resolve at video speed causing undesirable artifacts to be less noticeable as a result).

As referenced in FIG. 5B, the unmodified method for implementing multiple intensity levels in conjunction with pulse width modulation is shown without respect to the lower order bits which are ignored for the sake of visual and explanatory clarity. By already implementing intensity modulation, this fifth embodiment already enjoys some actual pulse width truncation as described for earlier embodiments where such intensity modulation is taught herein. However, there are additional performance enhancements available that may be gained by introducing a new method to add virtual pulse width truncation. Virtual pulse width truncation involves the principles of visual perception, and exploits the fact that by rearranging the bits in an appropriate way, the bulk of the visual data comprising the important elements of a video frame will be displayed close together in time, forming a tighter-packed ensemble of bit weights, while the lower order bit weights are postposited behind the more significant bits and, being lower order bits, are (in principle) less visible, tending to cause whatever artifacts may arise to be reduced in visual magnitude.

Figure 5D:
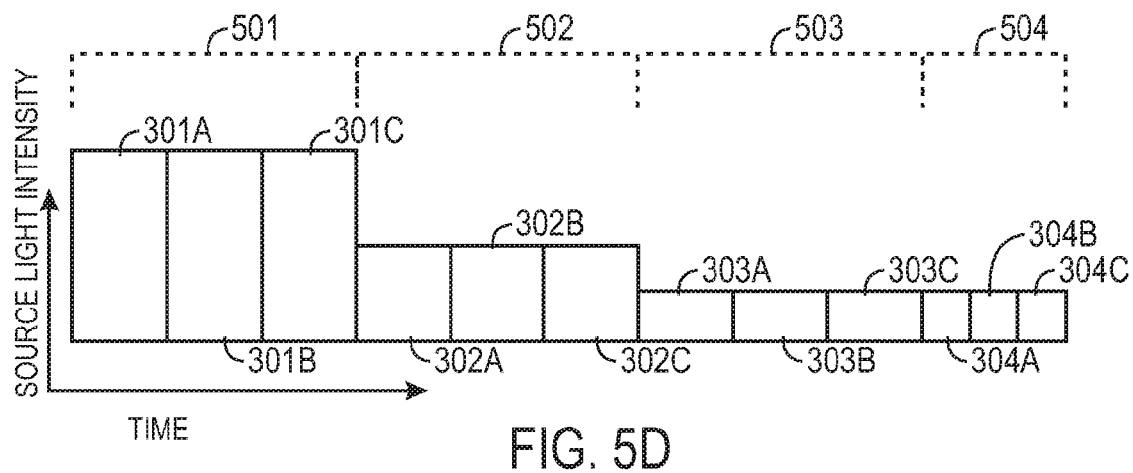
FIG. 5D illustrates the hard-wired interleaving of the various intensities and pulse widths shown in FIG. 5B so as to force all the highest order bits, regardless of program content, to be displayed at the beginning of the aggregate pulse comprising the video frame for all three primary colors.

FIG. 5D illustrates the hard-wired interleaving of primaries to achieve the desired virtual pulse width modulation. Note that the highest order bits referred to as the most significant bits $301a$, $301b$, and $301c$ for the three primary colored lights a, b, c are displayed first as a first ensemble 501 comprising bits $301a$, $301b$, and $301c$. Thereafter, the second most significant bits $302a$, $302b$, $302c$ are displayed second as a second ensemble 502, followed by a descending series of bit orders (i.e., third most significant bits $303a$, $303b$, $303c$ are displayed third as a third ensemble 503, followed by the fourth most significant bits $304a$, $304b$, $304c$ displayed fourth as a fourth ensemble 504). This sequence is termed hard-wired since it invariably displays the bit planes comprising the respective gray scale decomposition of any given video frame according to this precise sequence. This sequence need not be synchronous (tied irrevocably to a clock) if some bit weights are not included in the program content, a circumstance which could lead to further temporal truncation. The bit weight order taught in FIG. 5D will tend to insure that the phenomenon of virtual pulse width truncation will occur for a majority of video frames being processed by the display system. One advantage of this approach is that it requires no real time analysis of video content, by virtue of being hard-wired as a method for encoding the data. Therefore, this fifth embodiment enjoys not only the benefits of actual aggregate pulse width truncation, it adds the benefits of virtual pulse width truncation to further reduce the appearance of possible visual artifacts related to field sequential color display system operation. Note, too, that the method illustrated in FIG. 5D can be applied even if intensity modulation is not being applied, as previously illustrated in FIG. 3F. This embodiment of the present disclosure may also include any ordering of the bits within each of the ensembles 501, 502, 503, etc., shown in FIG. 5D, whether or not the flux is generated by a combination of intensity and pulse width modulation, solely by pulse width modulation, or solely by intensity modulation, for example in ensemble 501 the bits may be any order such as $301b$, $301c$, $301a$. It should also be noted that the precise position within the $\frac{1}{60}^{th}$ overall frame being displayed for the most significant bits is not important, for example, while FIG. 5D suggests that the heaviest weighting (i.e., most significant bits) occurs at the left, early in the aggregate pulse for all the bit weights to be displayed, the most significant bits could just have easily been situated at the right, and have thus been back-loaded, with identical generation of the virtual pulse width truncation effect. Distribution of the heaviest weighting around the center of the $\frac{1}{60}^{th}$ of a second frame period would be of equal potential value. The embodiment covers all such variations of the loading sequence, for which a point to be grasped for this method is an explicit concentration of the most significant bits as close in time as possible, regardless where within the frame pulse said concentration is to occur. The fact that FIG. 5D illustrates that this concentration is at the front of the pulse, at the left, is not material to the embodiment but only represents one possible (and convenient) approach. Wherever the concentration of the highest bits is positioned, it may be hard-wired to always fall in that position insofar as this embodiment is concerned.

A sixth embodiment is a method that may include combining intensity modulation with PWM to create a real-time dynamically-determined front-loaded bit weighting to further enhance perceived mitigation of motional artifacts using virtual aggregate pulse width truncation. The sixth embodiment of the present disclosure may apply the same general virtual truncation as the fifth embodiment does, and thereby also serves to mitigate motional breakup artifacts without, in fact, truly truncating the pulse in time. This sixth embodiment is dependent upon real-time evaluation of each frame being generated, because the distribution and weighting of the bits is no longer hardwired and synchronously fixed, but is determined in real time video frame by video frame. The rearrangement of the bits to be displayed in this sixth embodiment must be calculated prior to generation of the frame for actual display to the viewer, which will likely require look-ahead capability in the video cache to preprocess each frame in regard to the required real-time analysis process. In contrast to the hardwired bit sequence of the fifth embodiment, the sixth embodiment dynamically adjusts the bit sequence in light of the exigencies of each frame's program content, thereby insuring that the correct bits are truly weighted to the front of the aggregate pulse being encoded across all primary colored lights, which cannot always be guaranteed in the case of the hardwired fifth embodiment.

In regard to program material (video content), it is not always true that the highest order bits contain the video information that defines the key thresholds within a video image. The fifth embodiment, therefore, represents a very useful approximation and provides virtual aggregate pulse width truncation for about 75% or more of the information being displayed on a video system so equipped. But, for the remaining 25% of program content, the fifth embodiment may provide no apparent advantage or could even theoretically serve to extend rather than truncate the virtual perception of the pulse, therefore aggravating rather than mitigating motional artifacts during the display of the affected video frames.

Figure 5E:
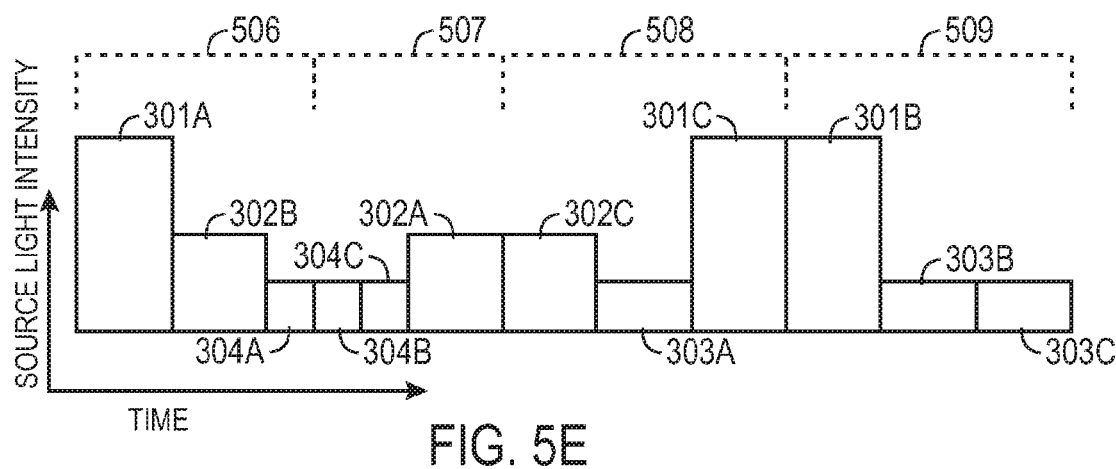
FIG. 5E illustrates one possible result due to real-time analysis of each video frame to determine which bits are most important based on image content, therefore making the frame-to-frame sequence of the intensities and pulse widths to be dynamically variable based on the image content of the frame being displayed.

This sixth embodiment discloses an alternative method for determining the best order in which to display the bit weights comprising a video frame. Real-time video analysis software that is capable of calculating the visually significant gray scale levels in a full color frame at full operational speed can supply a display system with the means to re-order the bit weights on a frame-by-frame basis to insure that the bit weights that truly represent the most visually significant bits (not merely the bits that represent the largest arithmetic values) are displayed first. In most cases, these values are likely to match that for the hard-wired front-loaded bit weight encoding method disclosed in the fifth embodiment above, but any given frame may well deviate from this standard, as suggested in FIG. 5E, where the most visually significant bits $301a$, $302b$, $304a$ (as contrasted to the conventional definition of most significant bit as a purely mathematical definition) are displayed first in a first ensemble 506, followed by the next most visually significant bits 304b, 304c, 302a displayed second in a second ensemble 507, followed by the next most visually significant bits 302c, 303a, 301c displayed third in a third ensemble 508, followed by the next most visually significant bits 301b, 303b, 303c displayed fourth in ensemble 509 (e.g., the least most visually significant bits in ensemble 509 for a 4-bit system as illustrated in FIG. 5E), etc. Note that the constituent elements comprising the most visually significant bits 506 are clearly not the three most significant bits as they appeared in FIG. 5D. Because the video content may involve objects of one color moving against a background with a rather similar color, the distinction between the object and its background is likely to be determined by bits other than the most significant bits mathematically considered, but rather by bits that define the shade of difference between object and background, which could readily be a lower order bit, as suggested by the composition of first ensemble 506 in FIG. 5E. The sample provided in FIG. 5E gives an arbitrary example, for implementation of this sixth embodiment would likely entail the customization of the bit weight sequence for every consecutive frame of video being encoded by the display driver circuitry to provide both maximum actual aggregate pulse width truncation across all colors, plus maximum virtual pulse width truncation due to front-loading of the most visually significant bits determined on a frame-by-frame basis by the system doing the video analysis and providing the driver circuitry the correct information to re-arrange the interleaving of the various primaries, their intensities, and their pulse widths to insure the desired result as elaborated above.

A seventh embodiment is a method that may include the real-time quantizing/posterizing of foreground objects moving relative to their background in a video frame sequence to gain actual and virtual aggregate pulse width truncation and concomitant mitigation of motional artifacts associated with FSC displays. The seventh embodiment of the present disclosure may extend a method of the fifth and sixth embodiments to a more elaborate level to achieve further gains in the realm of motional artifact mitigation in field sequential color displays. This embodiment is a variant of the previous method and includes determination (by intelligent real-time frame analysis software) of which portions of the image represent foreground objects in sufficiently rapid motion against the background being displayed to warrant the imposition of artifact mitigation methods. Motional artifacts are known to aggregate around such foreground objects at their borders in the direction of motion across the display. The method calls for the identified part of the frame that represents the moving foreground object to be converted, via an intelligent modulo method, into a reduced bit-depth image with the bits comprising the object being targeted for front-loading for the frame in question. For example, an airplane against a blue sky would be identified as a foreground moving object by the video analysis software. Both airplane and blue sky are originally encoded as 24-bit color (8 bits per tristimulus primary). The revised frame in this method would re-encode the airplane portion of the frame in a reduced bit-depth (e.g., 12-bit color, or 4 bits per tristimulus primary), and those moving-object-related bits for all relevant tristimulus primary colors would be front-loaded and transduced first before processing the remaining 12-bits which define the sky's greater bit depth. Because the foreground object is in sufficiently rapid motion, the loss of bit-depth is not apparent to the eye during its transit across the display. This real-time dynamic bit-depth adjusting method is invoked only as needed based on program content to mitigate and/or prevent the onset of motional color artifacts.

Figure 6:
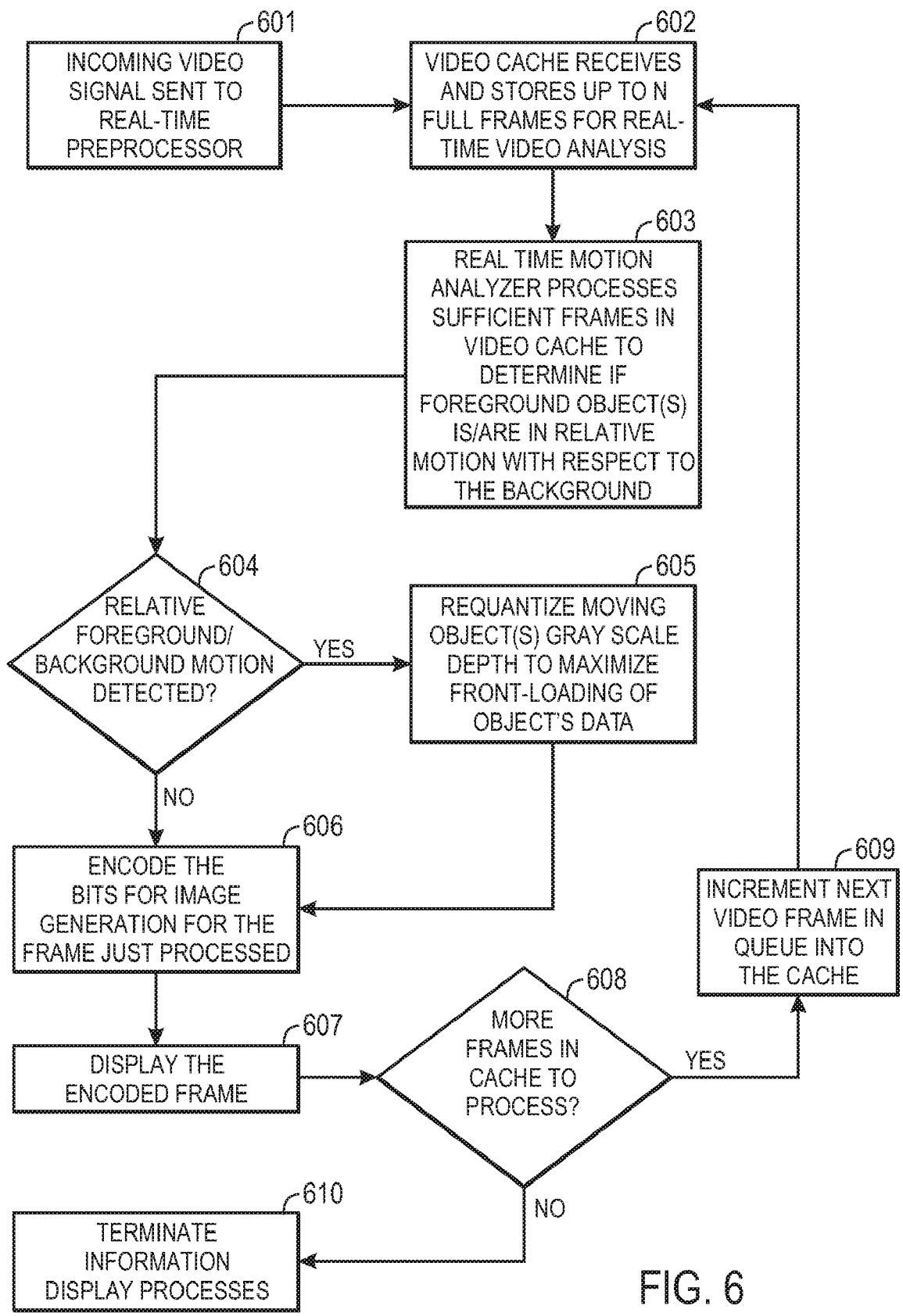
FIG. 6 sets forth a method for dynamically altering the gray scale depth for regions of the video display that are contextually shown, according to real-time analysis of consecutive frames within the display system's video cache, to represent foreground objects in relative motion against the perceived background, such that if a detectable threshold for motional artifact generation is crossed by such motion, the moving foreground object is posterized and/or quantized to permit maximum front-loading of image data during the full three-primary color pulse displaying the frames in question.

This seventh embodiment is schematically illustrated in a flow chart depicted in FIG. 6, which provides a method for preprocessing video data to be encoded using field sequential color pulse width modulation techniques. The mitigation of motional artifacts may be applied to specific regions of a video frame, those regions most likely to be affected by artifacts by virtue of relative motion between that region (which thus represents a moving foreground object) and the background. Motional artifacts tend to occur at the borders of the foreground object and appear as color smearing and decoupling in the direction of apparent motion of the object. The principles that inhere in this method may also be adapted to situations where motional breakup is caused by relative motion of the display screen with the viewer's head (such as might occur with an avionics display when the pilot's cockpit is significantly vibrating). In that instance, a desired preprocessing effect may be imposed on the entire display if vibration is detected by an appropriate sensor. In general use, however, the preprocessing effect under this method is applied to objects in the video frame sequence that are intelligently determined, via real-time video analysis, to be moving at sufficient speeds relative to their background as to cause a significant risk for motional artifact generation and the resulting temporal decoupling of the edges of the object being tracked by the observer's eyes.

By way of background, there are means in the prior art for determining which parts of a video frame sequence represent an object in motion. Two methods for conducting such real-time analysis have been put forward by Zlokolica et al. ("Fuzzy logic recursive motion detection and denoising of video sequences," *Journal of Electronic Imaging*, April-June 2006/Vol. 15(2), 023008-1ff) and by Argyriou and Vlachos ("Extrapolation-free arbitrary-shape motion estimation using phase correlation," *Journal of Electronic Imaging*, January-March 2006/Vol. 15(1), 010501-1ff). Therefore, the implementation of such a step within the method disclosed hereunder shall be understood to represent either one or the other of such methods, a combination of them, or an equivalent or superior approach to that enunciated by these research teams, and as such reflects an existing but growing body of knowledge in the field of image analysis, particularly in regard to video analysis. Because motion detection under such systems requires several subsequent frames to be analyzed at once, this embodiment presupposes the existence of a suitable video cache capable of feeding such a real-time analysis system as might be assembled according to principles published by the researchers alluded to above.

Further, this embodiment is based on selective posterization (or quantization) of the moving region(s), if any, in the video stream being analyzed. Posterization involves a deliberate reduction in the amount of gray scales involved in depicting an image or a portion of an image. When a part of the video stream is detected to represent a foreground object moving rapidly with respect to the background, it may be advantageous for that object to undergo both actual and virtual aggregate pulse width truncation to mitigate the artifacts that could arise if the frame rates or blanking periods are not suitably configured. One way to induce such truncation is to reconfigure the moving object in regard to the bit weights comprising it, so that it may be represented by four or five bits rather than all eight bits of each primary color. This reduction in bit depth will cause a visual effect known as posterization, wherein gentle gradations within the object become more sharply defined and less smooth. Since the object is in rapid motion, this brief loss of gray scale depth is far less objectionable than motional color breakup artifacts are (which even tend to elongate the moving object in the direction of motion, which is unacceptable for display systems involved in training pilots in simulator systems where target acquisition is premised on accurate shapes for moving objects on-screen).

Therefore, by reducing the bit depth of the moving object and reconfiguring the display bit order for all primaries in light of the basic principles incorporated in the sixth embodiment (and reflected in the example given in FIG. 5E in which the most visually significant bits take precedence over the mathematically most significant bits), a performance improvement in regard to motional artifact mitigation can be enjoyed by the display incorporating this method.

Referring to FIG. 6, incoming video signal 601 is received in the video cache 602 that is used to feed data in appropriate increments frame-by-frame to the real-time motion analysis subsystem 603, a system such as was alluded to above in regard to the prior art in the field of real-time image analysis applied to video streams Several frames are processed at once by the analyzer 603 to determine the status, in temporal context, of the first frame being processed. The system then determines 604 whether or not there is any relative motion between one or more foreground objects and the apparent background, and whether or not the motion is sufficiently rapid as to be likely to cause motional color breakup artifacts. If there is such relative motion, then the defined region(s) of the video frame that are detected to be in rapid relative motion are resampled/posterized/quantized 605 so as to intelligently reduce the number of gray scales defining the region(s) detected to be in motion (and thus representing moving objects against the displayed background in the video frame). The bit sequence for encoding may also be adjusted in real-time if the principles of the sixth embodiment are being followed in the device, otherwise not. If there was no detected relative motion, then the video frame is not posterized or resampled but is passed on as-is to the primary encoding engine 606. If there was indeed such motion, the parameters for the video adjustment are handled at the analyzer 605 and any encoding-specific adjustments (if the sixth embodiment is also implemented) are passed as determinative parameters to the encoding engine 606 which then determines the order of the bits to be displayed across all three primary colors.

The video frame, whether or not it has undergone real-time selective dynamic posterization at 605, is displayed at 607; the video cache is queried 608 to determine if it is empty. If it is, information display would naturally cease 610; if there are more frames to process, then the system increments 609 such that sufficient video frames are present in the cache 602 to insure that the real time motion analysis system 603 can continue to correctly determine whether the frames in context exhibit sufficient relative motion within the program content to trigger the posterization step 605.

The posterization step may involve any number of rounding methods to secure the desired result. One example of such a method is disclosed in "Adaptive color quantization using the baker's transformation," by Montagne et al., *Journal of Electronic Imaging*, April-June 2006, Vol. 15(2), 023015-1ff), however there are a host of methods for securing useful results. The purpose of the posterization step is to provide further gains in artifact mitigation by reducing the system overhead required for generating the full gray scale bit depth for the moving object. Instead of, for example, the object (which may be an aircraft being displayed against a blue sky) being displayed in 24-bit color, it may be displayed in 12-bit color if it is moving rapidly against the sky in the video sequence. The combination of the sixth and seventh embodiments herein will provide maximum actual and virtual truncation of the aggregate color pulses that generate these images.

It should be understood that the methods outlined here are not limited to the three tristimulus primaries but may be applied to extended gamut scenarios where additional visible primary colored light(s) are used to encode video data. The methods outlined here may also be applied to the interleaving of nonvisible primaries (e.g., infrared light) with visible primaries as well, and is not restricted in any way to the three well-known tristimulus primaries (e.g., red-green-blue). The same methods for intensity modulation coordinated with pulse width modulation and the other methods disclosed apply to all such display systems.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

The invention claimed is:

1. A method comprising:
   displaying a video image using field sequential color encoded in a plurality of video frames;
   receiving the plurality of video frames for displaying a foreground object and a background image in the video image;
   determining in the received plurality of video frames that the foreground object of a video image of at least one of the video frames is in motion relative to the background image of the video image;
   modifying a gray scale of the at least one of the video frames associated with the foreground object that is in motion relative to the background image of the video image to reduce the number of gray scales defining the foreground object;
   encoding the plurality of video frames including the modified video frame for image generation; and
   displaying the encoded plurality of video frames, including the modified video frame;
   wherein the plurality of video frames are displayed by temporally segregating primary color components of the video images by presenting each frame of video information by rapid consecutive generation of each primary component; and
   wherein the modifying step further comprises shortening a pulse width of a most significant bit of one of the primary color components associated with the foreground object to be displayed in the video image.

2. The method as recited in claim 1, wherein the modifying step requantizes a gray scale depth of the foreground object to increase front-loading of data in the video frame associated with the foreground object.

3. The method as recited in claim 1, wherein the motion determined is rapid movement of the foreground object relative to the background image.

4. The method as recited in claim 1, wherein the video images are displayed with at least one non-tristimulus primary color.

5. The method as recited in claim 1, wherein the pulse width of the most significant bit of one of the primary color components has an amplitude greater than an amplitude of other pulse widths of bits of one of the primary color components.

6. The method as recited in claim 1, wherein the modifying step further comprises:

re-arranging an order of the bits of different primary color components associated with the foreground object to be displayed in the video image.

7. The method as recited in claim 1, wherein the modifying step further comprises:
subdividing a pulse width of one bit of one of the primary color components and rearranging the subdivided bit of the one of the primary color components.

8. A method for removing field sequential color artifacts that arise in a display system that temporally segregates color components of a video image and presents each frame of video information by rapid consecutive generation of each color component when the color components of the video image making up a
composite frame of video information do not all reach a same region of an observer's retina due to relative motion of the retina and the video image to be displayed, the method comprising:
receiving a video signal for displaying the video image comprising a foreground object and a background image, the video signal further comprising a plurality of video frames, each video frame comprising a plurality of bits representing a gray scale of one of a plurality of the color components used by the display system to display the video image;
determining that the foreground object is moving relative to the background image; and
modifying a video frame containing color gray scale information associated with display of the foreground object to reduce the number of gray scales defining the foreground object;
wherein the plurality of video frames are displayed by temporally segregating primary color components of the video images by presenting each frame of video information by rapid consecutive generation of each primary component; and
wherein the modifying step further comprises shortening a pulse width of a most significant bit of one of the primary color components associated with the foreground object to be displayed in the video image.

9. The method as recited in claim 8, wherein the modifying step requantizes a gray scale depth of the foreground object to increase front-loading of data in the video frames associated with the foreground object.

10. The method as recited in claim 8, wherein the modifying step further comprises:
shortening a time one of the plurality of bits is generated in the video frame containing the color gray scale information associated with display of the foreground object.

11. The method as recited in claim 10, wherein the modifying step further comprises:
increasing an amplitude of the one of the plurality of bits.

12. The method as recited in claim 8, wherein the modifying step further comprises:
subdividing and re-arranging an order of the plurality of bits of different primary color components in the video frame containing the color gray scale information associated with display of the foreground object.

13. The method as recited in claim 8, wherein the modifying step further comprises:
re-arranging most significant bits from a plurality of video frames representing the foreground object so that the most significant bits are processed in succession.

14. A display system comprising:
a display panel for displaying a video image using field sequential color encoded in a plurality of video frames;
a video cache for receiving the plurality of video frames for displaying a foreground object and a background image in the video image;
a motion analyzer processing the plurality of video frames for determining whether the foreground object is moving relative to the background image;
the motion analyzer determining the foreground object is moving relative to the background image and further comprising circuitry for modifying a gray scale of the foreground object of at least one of the plurality of video frames in response thereto to reduce the number of gray scales defining the foreground object in the at least one of the plurality of video frames;
an encoder for encoding the plurality of video frames including the modified video frame for image generation; and
displaying the encoded plurality of video frames, including the modified video frame;
wherein the plurality of video frames are displayed by temporally segregating primary color components of the video image by presenting each frame of video information by rapid consecutive generation of each primary component; and
wherein the modifying circuitry shortens a pulse width of a most significant bit of one of the primary color components associated with the foreground object to be displayed in the video image.

15. The system as recited in claim 14, wherein the modifying circuitry shortens a pulse width of a most significant bit of the at least one of the plurality of video frames.

16. The system as recited in claim 15, wherein the pulse width is also modified to have an amplitude greater than an amplitude of other pulse widths of bits in the video frame.

17. The system as recited in claim 14, wherein the modifying circuitry further comprises:
circuitry for re-arranging an order of the bits of different primary color components in the at least one of the plurality of video frames.

* * * * *